US006204350B1

(12) United States Patent
Liu et al.

(10) Patent No.: US 6,204,350 B1
(45) Date of Patent: Mar. 20, 2001

(54) CURE-ON-DEMAND, MOISTURE-CURABLE COMPOSITIONS HAVING REACTIVE SILANE FUNCTIONALITY

(75) Inventors: Junkang Jacob Liu, Woodbury; Charles M. Leir, Falcon Heights; George G. I. Moore, Afton; Audrey A. Sherman, St. Paul; Albert I. Everaerts, Oakdale; Marie A. Boulos, St. Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/153,967

(22) Filed: Sep. 16, 1998

Related U.S. Application Data

(63) Continuation-in-part of application No. 08/815,029, filed on Mar. 14, 1997, now abandoned.

(51) Int. Cl.[7] .................................................. C08G 77/08
(52) U.S. Cl. ........................... 528/23; 528/39; 427/515; 427/516; 427/195
(58) Field of Search .......................... 427/515, 516, 427/195; 528/39, 23

(56) References Cited

U.S. PATENT DOCUMENTS

| Re. 24,906 | 12/1960 | Ulrich ................................ 206/59 |
| 2,676,182 | 4/1954 | Daudt et al. ....................... 260/448.2 |
| 2,736,721 | 2/1956 | Dexter ................................ 260/42 |
| 2,843,555 | 7/1958 | Berridge ............................ 260/18 |
| 3,627,851 | 12/1971 | Brady ................................ 260/825 |
| 3,772,247 | 11/1973 | Flannigan .......................... 260/46.5 |
| 3,971,751 | 7/1976 | Isayama et al. .................... 260/37 |
| 3,981,897 | 9/1976 | Crivello ............................ 260/440 |
| 4,069,054 | 1/1978 | Smith ................................ 96/115 |
| 4,094,911 | 6/1978 | Mitsch et al. ..................... 260/615 |
| 4,101,513 | 7/1978 | Fox et al. .......................... 526/193 |
| 4,269,963 | 5/1981 | Homan et al. ..................... 528/17 |
| 4,444,974 | 4/1984 | Takase et al. ..................... 528/33 |
| 4,507,469 | 3/1985 | Mita et al. ........................ 528/425 |
| 4,525,566 | 6/1985 | Homan et al. ..................... 528/17 |
| 4,530,882 | 7/1985 | Homan et al. ..................... 428/452 |
| 4,707,531 | 11/1987 | Shirahata ........................... 528/12 |
| 4,720,533 | 1/1988 | Pettigrew .......................... 528/28 |
| 4,736,048 | 4/1988 | Brown et al. . |
| 4,743,474 | 5/1988 | Homan ............................. 427/387 |
| 4,754,013 | 6/1988 | Antonen ........................... 528/15 |
| 4,767,820 | 8/1988 | Keogh .............................. 525/72 |
| 4,774,310 | 9/1988 | Butler .............................. 528/23 |
| 4,870,130 | 9/1989 | Achtenberg et al. .............. 524/787 |
| 4,889,753 | 12/1989 | Brown et al. ..................... 428/40 |
| 4,935,484 | 6/1990 | Wolfgruber et al. .............. 528/34 |
| 4,968,766 | 11/1990 | Kendziorski . |
| 5,028,679 | 7/1991 | Terae et al. . |
| 5,066,699 | 11/1991 | Lee et al. ......................... 524/379 |
| 5,077,249 | 12/1991 | Lee et al. ......................... 502/5 |
| 5,091,483 | 2/1992 | Mazurek et al. .................. 525/477 |
| 5,110,890 | 5/1992 | Butler .............................. 528/12 |
| 5,214,119 | 5/1993 | Leir et al. ......................... 528/28 |

(List continued on next page.)

FOREIGN PATENT DOCUMENTS

| 837782 | 7/1976 | (BE) . |
| 39 03 338 | 8/1990 | (DE) ........................... C08L/83/04 |
| 0 199 445 | 10/1986 | (EP) ............................ C08F/8/42 |
| 0 229 678 | 7/1987 | (EP) ............................ C08F/283/00 |
| 0 311 262 | 4/1989 | (EP) ............................ C08L/83/08 |
| 0 354 472 | 2/1990 | (EP) ............................ C08G/18/10 |
| 0 378 420 | 7/1990 | (EP) ............................ C08L/83/08 |
| 0 401 540 | 12/1990 | (EP) ............................ C08L/43/04 |
| 0 433 070 | 6/1991 | (EP) ............................ C09D/171/00 |
| 0 500 100 A2 | 8/1992 | (EP) ............................ H04N/5/445 |
| 1 539 192 | 1/1979 | (GB) ........................... C08J/3/24 |
| 61-286392 | 12/1986 | (JP) ............................ C07F/7/08 |
| 63-30571 | 2/1988 | (JP) ............................ C09D/3/78 |
| 2-36234 | 2/1990 | (JP) ............................ C08G/77/04 |
| 2-75649 | 3/1990 | (JP) ............................ C08L/27/12 |
| 3-259917 | 11/1991 | (JP) ............................ C08G/63/78 |
| 4-363319 | 12/1992 | (JP) ............................ C08G/65/32 |
| 6-16745 | 1/1994 | (JP) ............................ C08F/291/00 |
| WO 94/06848 | 3/1994 | (WO) ........................... C08J/3/24 |
| WO 97/35930 | 10/1997 | (WO) . |

OTHER PUBLICATIONS

Odian, *Principles of Polymerization*, Third Edition, 1991 (pp. 286–296).

*Encyclopedia of Polymer Science and Engineering*, vol. 15, "Scattering to Structural Foams", (1989), pp. 252, 265–270.

J.V. Crivello et al., "Cationic Photopolymerization of Ambifunctional Monomers", *Macromolecular Symposia*, 95, 79–89, (1995).

Abstract, Inoue et al., "Photo–curing of carbon–functional alkoxysilanes. I. Photo–curing of epoxy–functional alkoxysilanes", *Nippon Setchaku Gakkaishi*, 32(10), 370–376, 1996.

Abstract, Inoue et al., "Photo–curing of carbon–functional alkoxysilanes. II. Photo–curing of vinyl–functional alkoxysilanes", *Nippon Setchaku Gakkaishi*, 32(12), 439–445, 1996.

*The American Heritage College Dictionary*, 3rd Ed., p. 699, 1977.

Huettner et al., "Moisture Curing Silicone Release Coating Technology: A Coating Process Is The Missing Component", PSTC Technical Seminar, Chicago, Il, May 4–6, 1988.

*Primary Examiner*—Robert Dawson
*Assistant Examiner*—Kuo-Liang Peng

(57) ABSTRACT

Cure-on-demand, moisture-curable compositions of one or more compounds comprising molecules having reactive silane functional groups and an acid generating material are taught herein. The acid generating material releases an acid upon exposure to heat, ultraviolet light, visible light, electron beam irradiation or microwave irradiation to initiate and accelerate the crosslinking reaction. Articles prepared using the moisture curable materials are also disclosed, as are methods of curing those materials.

52 Claims, No Drawings

U.S. PATENT DOCUMENTS

| | | | |
|---|---|---|---|
| 5,227,442 | 7/1993 | Babu et al. | 526/279 |
| 5,248,739 | 9/1993 | Schmidt et al. | 525/477 |
| 5,262,558 | 11/1993 | Kobayashi et al. | 556/453 |
| 5,264,515 | 11/1993 | Cody et al. | 528/10 |
| 5,286,815 | 2/1994 | Leir et al. | 525/477 |
| 5,296,561 | 3/1994 | Babu et al. | 525/342 |
| 5,302,685 | 4/1994 | Tsumura et al. | 528/33 |
| 5,306,758 | 4/1994 | Pellerite | 524/366 |
| 5,319,040 | 6/1994 | Wengrovius et al. | 525/478 |
| 5,340,989 | 8/1994 | Cavezzan et al. | |
| 5,378,585 * | 1/1995 | Watanabe | 430/176 |
| 5,389,170 | 2/1995 | Brady et al. | 156/109 |
| 5,397,648 | 3/1995 | Babu et al. | 428/523 |
| 5,409,963 | 4/1995 | Takeoka | 522/31 |
| 5,442,027 | 8/1995 | Donatalli et al. | 528/18 |
| 5,460,863 | 10/1995 | Kessel et al. | 428/40 |
| 5,461,134 | 10/1995 | Leir et al. | 528/14 |
| 5,475,076 | 12/1995 | Braun et al. | 528/14 |
| 5,475,077 | 12/1995 | Sat et al. | 528/14 |
| 5,475,124 | 12/1995 | Mazurek et al. | 556/419 |
| 5,486,565 | 1/1996 | Gentle et al. | 524/30 |
| 5,512,650 | 4/1996 | Leir et al. | 528/14 |
| 5,514,728 | 5/1996 | Lamanna et al. | 522/31 |
| 5,516,812 | 5/1996 | Chu et al. | 522/20 |
| 5,554,664 | 9/1996 | Lamanna et al. | 522/25 |
| 5,576,356 | 11/1996 | Leir et al. | 522/31 |
| 5,616,672 | 4/1997 | O'Brien et al. | |
| 5,683,798 | 11/1997 | Bennett et al. | |

* cited by examiner

CURE-ON-DEMAND, MOISTURE-CURABLE COMPOSITIONS HAVING REACTIVE SILANE FUNCTIONALITY

This is a continuation-in-part of application Ser. No. 08/815,029 filed Mar. 14, 1997, now abandoned.

BACKGROUND OF THE INVENTION

1. Field of the Invention

This invention relates generally to moisture-curable compositions and, in particular, to those having reactive silane functionality. The compositions of the invention may be cured on demand using an acid generating material. The invention further relates to methods of using such compositions.

2. Description of the Related Art

Moisture-curable compositions cure in the presence of moisture to form crosslinked materials such as adhesives, sealants and coatings that are useful in many industries. The moisture is typically obtained from the atmosphere or from a substrate to which the composition has been applied, although it may be added to the composition.

Moisture-curable compositions usually comprise polymers having groups (for example, alkoxysilane or acyloxysilane moieties) that react in the presence of moisture to form cured (i.e., crosslinked) materials. A wide variety of polymers may be rendered moisture curable, including polyolefins, polyesters, polyethers, polyacrylates, polyvinyl chloride, polyphosphazenes, polysiloxanes, polysulfides, block copolymers and fluorinated derivatives thereof, the particular polymer being selected based on the intended use. For example, a polysiloxane or fluorinated polyether is often selected to provide release coatings suitable for use with pressure-sensitive adhesives.

Moisture-curable compositions comprising alkoxysilane or acyloxysilane functionality typically cure in two reactions. In the first reaction, the alkoxysilane or acyloxysilane groups hydrolyze in the presence of moisture and a catalyst to form compounds having silanol groups. In the second reaction, the silanol groups condense with other silanol, alkoxysilane, or acyloxysilane groups in the presence of a catalyst to form —Si—O—Si— linkages. The two reactions occur essentially simultaneously upon generation of the silanol-functional compound. Commonly used catalysts for the two reactions include Brönsted and Lewis acids and are described in the *Encyclopedia of Polymer Science and Engineering,* 2nd Edition, Volume 15, page 252, (1989). A single material may catalyze both reactions.

The hydrolysis reaction is schematically illustrated below for a polymer having alkoxysilane groups:

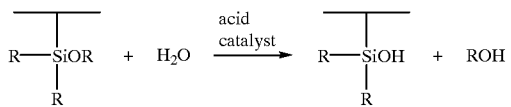

The resulting silanol (SiOH) groups are not stable in the presence of the acid catalyst and immediately condense with other silanol or alkoxysilane group to form —Si—O—Si— linkages as shown below schematically for the condensation reaction of a silanol-functional compound and an alkoxysilane-functional compound:

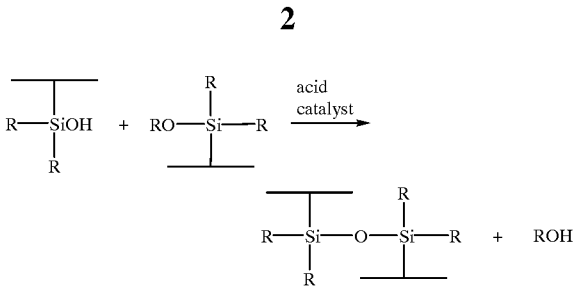

Preferably, the hydrolysis and condensation reactions proceed quickly once the moisture-curable composition has been applied, for example, to a substrate. At the same time, however, the reactions must not occur prematurely, for example, during processing or storage.

A good balance between these properties is often difficult to obtain as rapid reactivity and storage stability are opposite properties to each other. For example, highly active catalysts such as tetraalkyl titanate esters rapidly accelerate the moisture-curing reaction but at the same time make it difficult to process the materials without risking premature gelation in feed tanks, coating equipment, and other manufacturing and handling apparatus. On the other hand, conventional catalysts such as dibutyl tin dilaurate yield stable moisture-curable compositions that may be processed and stored without premature gelation, but the cure rate is often too slow to be commercially practical for most manufacturing operations.

A variety of approaches have been used for providing moisture-curable compositions that have acceptable cure rates without processing and storage difficulties. For example, U.S. Pat. No. 2,843,555 describes a two-part system, one part comprising a functional polymer and the other part comprising a catalyst with the two parts being mixed just prior before use. While this approach is useful in small-scale applications, it is less efficient for large-scale manufacturing where delays caused by having to mix the two parts are undesirable. Furthermore, coating operations must be completed expeditiously before the composition cures in the pot, and this can be difficult when working with large surface area substrates or a large volume of composition.

U.S. Pat. No. 5,286,815 discloses an ammonium salt catalyst that is inactive until heated sufficiently to liberate an acid compound that initiates the moisture curing reaction. However, liberation of the acid also generates an amine that must be removed by evaporation. In addition, the heat used to activate the catalyst may damage heat-sensitive substrates onto which the composition has been applied.

An article entitled "Cationic Photopolymerization of Ambifunctional Monomers" (J. V. Crivello et al., *Macromolekular Symposia,* 95, 79–89, (1995)) describes the photopolymerization of "Ambifunctional" monomers (i.e., monomers bearing two chemically different reactive functional groups within the same molecule) using cationic catalysts. In one example, an ambifunctional monomer having both epoxycyclohexyl and trimethoxysilyl reactive functional groups is prepared and then subsequently UV irradiated in the presence of a cationic triarylsulfonium catalyst. According to the authors, the polymerization of these monomers, " . . . is characterized by a rapid polymerization of the epoxy group followed by a slow consumption of the trialkoxysilyl groups."

Thus, there remains a need for moisture curable compositions that afford acceptable cure rates without processing and storage difficulties (e.g., premature gelation). Ideally, these compositions will be able to be processed efficiently, for example, without the need for mixing prior to cure, and will employ catalysts that do not generate species that have to be removed. Preferably, the compositions will not require heat activation so as to avoid damage to a heat sensitive substrate.

SUMMARY OF THE INVENTION

Broadly, and in one aspect, the present invention provides a moisture-curable composition that can be "cured on demand." That is, the composition can be cured at a preselected or predetermined time. To achieve such properties, the moisture-curable compositions of the invention include an acid generating material that remains inactive or inert (i.e., it does not initiate the moisture curing reaction) until it is activated at the preselected or predetermined time. Consequently, the acid generating material can be incorporated into the moisture-curable compositions without risking premature curing during processing or storage, and without special mixing just before use. In addition, once the acid generating material has been activated, curing proceeds rapidly and without producing undesirable species that must be removed.

More specifically, the present invention provides a moisture-curable composition comprising at least one compound having reactive silane functionality or groups, and an acid generating material. The reactive silane groups typically comprise a silicon atom bonded to one or more acyloxy or alkoxy groups. The average reactive silane functionality of the moisture curable composition is greater than 2 so as to form a crosslinked network upon curing, and the reactive silane groups are the only acid-curable groups in the composition.

It was found that the best results are obtained in the absence of acid curable groups other than reactive silane groups. In particular, it is believed that acid curable groups such as epoxides adversely effect the reaction of moisture with silanes, thereby resulting in a slow consumption of the trialkoxysilyl groups. Accordingly such other acid curable groups may inhibit the moisture curing of the silane reactive groups. Further water also is known to inhibit the polymerization of acid sensitive monomers.

A wide variety of acid generating materials can be used in the practice of the invention to catalyze the moisture curing reaction, including onium salts such as sulfonium and iodonium salts. These catalysts are known for use in the chain polymerization of epoxide, vinyl ether, olefinic and other cationically-curable groups, but their utility in catalyzing the condensation of reactive silane compounds having silanes as the only acid-curable group has not been previously recognized.

Activating the acid generating material liberates an acid that initiates and accelerates crosslinking of the moisture-curable composition through the formation of Si—O—Si crosslinks. Activation may be accomplished by irradiating the composition with, for example, ultraviolet, visible light, electron beam or microwave radiation. While heat may be used to activate the acid generating material, the compositions of the invention advantageously do not require this and thereby can avoid undesirable damage to heat sensitive substrates.

The invention further provides a method for curing a composition. More specifically, the method comprises the steps of providing a moisture-curable composition according to the invention, activating the acid generating material to liberate an acid, and allowing the composition to react in the presence of moisture and the liberated acid so as to form Si—O—Si crosslinks.

The moisture-curable compositions of the invention have a wide variety of uses including, for example, as adhesives, sealants, putties and coatings (especially as protective coatings and release coatings). Thus, in another embodiment, the invention provides a moisture-curable silicone pressure-sensitive adhesive.

DETAILED DESCRIPTION OF THE PREFERRED EMBODIMENTS

The present invention provides a moisture-curable composition comprising at least one compound having reactive silane functionality or groups, and an acid generating material. The reactive silane groups typically comprise a silicon atom bonded to one or more acyloxy or alkoxy groups. The average reactive silane functionality of the moisture curable composition is greater than 2 so as to form a crosslinked network upon curing. The reactive silane groups are the only acid-curable groups in the composition.

The average reactive silane functionality of a composition comprising molecules a, b, . . . ,n is defined by the following equation:

$$\text{Average Functionality} = \frac{f_a N_a + f_b N_b + \ldots f_n N_n}{N_a + N_b + \ldots N_n}$$

wherein $f_a$, $f_b$, . . . , $f_n$ represent the reactive silane functionality of molecules a, b, . . . n, respectively, and $N_a$, $N_b$, . . . , $N_n$ represent the number of moles of molecules a, b, . . . ,n, respectively.

The reactive silane functional compounds may comprise a wide variety of materials, optionally substituted with basic groups, such as amide, urea, urethane, sulfonamide, and other basic groups, that do not inhibit (i.e., as defined in *The American Heritage College Dictionary*, 3$^{rd}$ Ed., p. 699 (1997), prevent or decrease the reaction rate of) the crosslinking reaction via neutralization of the acid once it is has been generated. To prevent inhibition of the crosslinking reaction when such basic groups are present in the reactive silane compound, either a molar excess of the generated acid compared to the basic groups must exist in the moisture curable composition or the basic groups should be pre-neutralized (e.g., by the addition of sufficient acid to provide a neutral pH) prior to curing.

Reactive silane functional compounds useful in the invention can incorporate a wide variety of backbones to support the reactive silane groups and, as a result, such compounds may be generally represented by the following preferred structure:

Structure I

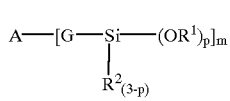

A is an m-valent radical which may be selected from, for example, alkyl groups (preferably having 1 to 30, more preferably, 12 to 20 carbon atoms); fluoroalkyl groups (preferably having 1 to 12, more preferably, 6 to 10 carbon atoms); aryl groups; fluoroaryl groups; and polymeric groups which may be of linear, branched, block or graft construction. Examples of suitable polymeric groups include polysiloxane, polyacrylate, polyolefin, polyether, polyester, polyurethane and polyphosphazene, as well as derivatives and combinations thereof. Particularly preferred derivatives of the aforementioned polymers are the fluorinated derivatives thereof such as, e g., fluorosilicone, fluorinated polyacrylate, fluorinated polyether or fluorinated polyester. Preferred polymeric groups for radical A include polysiloxane, polyacrylate, polyolefin and polyether.

The integral value of "p" is 1, 2 or 3, while the integral value of "m" is greater than or equal to 1, more preferably 1 to 50.

Each $R^1$ may be independently selected from (i.e., each one may be the same or different) alkyl radicals (preferably having 1 to 4 carbon atoms), or acyl radicals (preferably having 1 to 3 carbon atoms).

Each $R^2$ may be independently selected from hydrogen, acyl groups, alkyl groups, and aryl groups and the latter two may optionally be substituted with cyano, hydroxy, carboxy, mercapto, carboalkoxy or halo moieties. Preferably, however, $R^2$ is an alkyl group having 1 to 4 carbon atoms.

G is an optional linking group that bridges radical A to the reactive silane functional group(s). (Alternatively, G may be represented as $G_n$. When G is present, the value of n is 1. When G is absent, the value of n is 0.) Among the useful G groups are oxygen, alkylene and arylene radicals (optionally containing amido, urea, urethane, sulfonamido or ester linkages, or heteroatoms), and

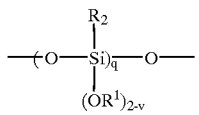

Structure II wherein $R^1$ and $R^2$ are defined above, q is all integer from 1 to 40, and v is either 0 or 1. G groups preferably have a number average molecular weight less than 2,000. Each G may be the same or different, and may be present in some repeating units but not others.

As noted above, preferred groups for radical A include polysiloxane, polyacrylate, polyolefin and polyether. We turn now to a more detailed discussion of these groups.

Reactive Silane Functional Polysiloxanes

Reactive silane functional polysiloxanes can be prepared by a number of convenient methods. For example, equilibration of —SiH functional cyclic siloxanes with cyclic dimethylsiloxanes provides polydimethylsiloxane copolymers with pendant and/or terminal —SiH groups. A disiloxane endblocker is typically included to control the molecular weight. Examples of such endblockers include tetramethyldisiloxane (which provides —SiH terminal groups) and hexamethyldisiloxane (which provides inert trimethylsilyl ends). The platinum-catalyzed hydrosilation reaction of these intermediates with vinyl silanes such as ω-alkenyl silanes (including vinyl triethoxysilane, vinyl methyl diethoxysilane, and vinyl dimethyl ethoxysilane) provide polysiloxanes having multiple mono-, di-, and trialkoxysilane groups. In another approach, polydiorganosiloxanes having either terminal and/or pendant vinyl substitution are converted into alkoxysilanes by the free-radical addition of mercapto alkyl substituted silanes (such as mercaptopropyl trimethoxy silane, and mercaptopropyl methyldimethoxy silane) to the double bonds. See, for example, U.S. Pat. No. 4,269,963.

Typically, the silicon atoms in the polysiloxane polymeric backbone are substituted with methyl groups. When substituents other than methyl groups are desired, a variety of synthesis routes may be used. For example, the linear polymethyl hydrogen siloxane, either with or without copolymerized dimethyl siloxane, can be first hydrosilated with the desired number of vinyl alkoxy or acyloxy silane groups, followed by complete conversion of the remaining SiH groups by reaction with an excess amount of an olefin, such as hexene, octadecene, styrene, trifluoropropene, nonafluorohexene, and the like. In another method, more suitable to the preparation of vinyl substituted polysiloxane intermediates, mixtures of vinyl substituted endblockers, cyclic vinyl methyl siloxanes, cyclic dimethyl siloxanes, and other cyclic or polysiloxanes having substituents other than methyl are equilibrated with strong, acid catalysts, such as sulfuric or trifluoromethanesulfonic acids. A convenient source of non-dimethylsiloxanes (in addition to the commercially available cyclic diphenyl siloxanes) is in the form of hydrolysates of various substituted methyldichloro silanes, such as octyl ethyldichloro silane, nonafluorohexyl methyldichloro silane, and the like.

Reactive silane functional polysiloxanes having urea-linkages can be derived from polydiorganosilanes having pendant and/or terminal aminoalkyl groups by reacting such aminoalkylpolydiorganosiloxanes with isocyanate-functional silanes, such as isocyanatopropyl triethoxysilane. Methods for making such reactive silane functional polysiloxanes are described in U.S. Pat. No. 5,286,815. Particularly useful starting materials are the organopolysiloxane diamines described in U.S. Pat. Nos. 5,214,119; 5,461,134; and 5,512,650 and the monoaminoalkyl-terminated organopolysiloxanes described in U.S. Pat. Nos. 5,091,483 and 5,475,124.

When fluorinated derivatives of reactive silane functional materials are used, they are prepared according to methods known in the art. For example, reactive silane functional polysiloxanes can be prepared from the platinum-catalyzed hydrosilation reaction of fluorosilicone starting materials having terminal and/or pendant —SiH functional groups with ω-alkenyl alkoxysilane compounds. Examples of useful —SiH functional fluorosilicones are organohydrogenpolysiloxanes containing silicon bonded fluorinated radicals described in U.S. Pat. No. 4,968,766 (Kendziorski). Alternatively, vinyl- or alkenyl-functional fluorosilicone materials, such as those described, for example, in U.S. Pat. No. 4,736,048 (Brown et al.) and U.S. Pat. No. 5,028,679 (Terae et al.) or the fluoroalkyl-substituted branched alkenyl silicone polymer compositions described in U.S. Pat. No. 5,616,672 (O'Brien et al.) can be converted into silane functional fluorosilicones via a similar hydrosilation reaction with alkoxysilane compounds (e.g., trimethoxysilane, triethoxysilane, and other mono-, di- and trialkoxy silanes). Some of these materials are available commercially. One example of a commercially available vinyl-functional fluorosilicone is that available from Dow Corning under the trade designation Q2-7785.

Reactive silane functional polysiloxanes are commonly used to provide release coatings for pressure-sensitive adhesive (PSA) applications. A particularly preferred reactive silane functional compound for making release coatings is dimethyl siloxane-[methyl-2(ethoxydimethylsilyl)ethyl-] siloxane copolymer which can be described by Structure I wherein G is —CH$_2$CH$_2$—, m is 6; p is 1; $R^1$ is —CH$_2$CH$_3$; $R^2$ is —CH$_3$; and A is as follows:

Structure III

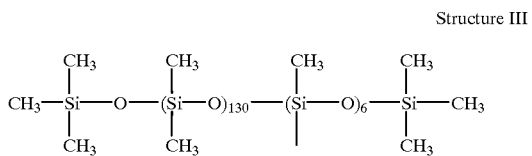

Another particularly preferred material for making release coatings can be described by Structure I wherein G is —$CH_2CH_2$—; m is 6; p is 3; $R^1$ is —$CH_2CH_3$; and A is Structure III above.

Another particularly preferred group of materials for making release coatings can be described by Structure I wherein G is —$CH_2CH_2CH_2$—$HNC(O)NH$—$CH_2CH_2CH_2$—; m is 2; p is 3; $R^1$ is —$CH_2CH_3$; and A is Structure IV shown below Structure IV

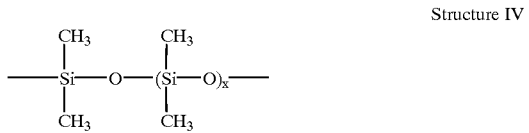

wherein the value of x is 10 to 2000.

Silicone Pressure-sensitive Adhesives Derived From Reactive Silane Functional Polysiloxanes In another aspect of this invention, a unique class of moisture curable silicone pressure-sensitive adhesives can be prepared by mixing a tackifying resin, preferably a silicate tackifying resin, with urea-linked reactive silane functional polysiloxanes. In particular, such silicone pressure-sensitive adhesive compositions comprise:

(a) 20 to about 80 parts by weight of an urea-linked reactive silane functional polysiloxane having the following formula based on Structure I, wherein G is —Y—HNC(O)NH—Y—; m is 2; p, $R^1$ and $R^2$ are as described above with respect to Structure I; Y is a divalent radical that independently is an alkylene radical of 1 to 10 carbon atoms, an aralkylene radical or an arylene radical preferably having 6 to 20 carbon atoms, and A is Structure V Structure V

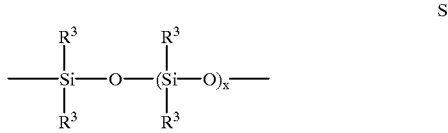

wherein $R^3$ is a moiety that independently is a vinyl radical or an alkyl moiety preferably having about 1 to 12 carbon atoms and which alkyl moiety may be substituted with, for example, trifluoroalkyl or a vinyl group, and x=100–2000;

(b) 80 to about 20 parts by weight of a silicate tackifying resin; and (c) about 0.5 to about 20 parts by weight of a condensation catalyst or an acid generating material, based on 100 parts by weight of (a) plus (b).

Silicate tackifying resins useful in preparing the pressure-sensitive adhesives include those resins composed of M, D, T and Q structural units, as well as combinations thereof (the single letter codes being conventionally used to describe silicate resins). Both nonfunctional and functional silicate resins may be used, the functional resins having one or more functional moieties including, for example, silicon-bonded hydrogen, silicon-bonded alkenyl, and silanol groups. More particularly, and by way of example, MQ silicate resins, MQD silicate resins, and MQT silicate resins (each of which also may be referred to as copolymeric silicate resins), preferably have a number average molecular weight of about 100 to about 50,000, more preferably about 500 to about 10,000 and generally have methyl substituents. MQ silicate resins typically have $R'_3SiO_{1/2}$ units and $SiO_{4/2}$ units and such resins are described in, for example, *Encyclopedia of Polymer Science and Engineering*, vol. 15, John Wiley & Sons, New York, (1989), pp. 265–270, U.S. Pat. No. 2,676,182, U.S. Pat. No. 3,627,851, U.S. Pat. No. 3,772,247, and U.S. Pat. No. 5,248,739. Various MQ silicate resins having functional groups are described in U.S. Pat. No. 4,774,310 (silyl hydride groups), U.S. Pat. No. 5,262,558 (vinyl and trifluoropropyl groups), and U.S. Pat. No. 4,707,531 (silyl hydride and vinyl groups). These MQ resins are generally prepared in solvent; dried, or solventless, MQ silicate resins can be prepared as described in U.S. Pat. No. 5,319,040, U.S. Pat. No. 5,302,685, and U.S. Pat. No. 4,935,484. MQD silicate resins are terpolymers having $R'_3SiO_{1/2}$ units, $SiO_{4/2}$ units, and $R'_2SiO_{2/2}$ units such as disclosed in U.S. Pat. No. 2,736,721. MQT silicate resins are terpolymers having $R'_3SiO_{1/2}$ units, $SiO_{4/2}$ units and $R'SiO_{3/2}$ units such as disclosed in U.S. Pat. No. 5,110,890 and Japanese Kokai HE 2-36234.

Commercially available silicate resins include SR-545 (MQ resin in toluene) available from General Electric Co., Silicone Resins Division, Waterford, N.Y.; MQOH resins available from PCR, Inc. Gainesville, Fla.; MQR-32-1, MQR-32-2, and MQR-32-3 (MQD resins in toluene) available from Shin-Etsu Silicones of America, Inc., Torrance, Calif.; and PC-403 a hydride functional MQ resin in toluene available from Rhone-Poulenc, Latex and Specialty Polymers, Rock Hill, S.C. Such resins are generally supplied in organic solvent and may be employed in the pressure-sensitive adhesives of the present invention as received. However, these organic solutions of silicate resin may also be dried by any number of techniques known in the art, such as spray drying, oven drying and the like, or steam separation to provide a silicate resin at a substantially 100% nonvolatile content for use in the present invention. Also useful in the pressure-sensitive adhesives of the present invention are blends of two or more different silicate resins.

The moisture curable silicone pressure-sensitive adhesives preferably contain about 20 to 80 parts by weight of a urea-linked reactive silane functional polysiloxane, more preferably about 25 to 75 parts by weight, and most preferably about 30 to 70 parts by weight. The adhesives preferably contain about 20 to 80 parts by weight silicate tackifying resin, more preferably about 25 to 75 parts by weight, and most preferably about 30 to 70 parts by weight. Based on a combined 100 parts by weight of the urea-linked reactive silane functional polysiloxane and silicate tackifying resin, the composition contains about 0.5 parts by weight to about 20 parts by weight acid generating material, more preferably about 3 to 10 parts by weight, most preferably about 3 to 7 parts by weight.

Although the acid generating material described above is preferred due to the controlled curability it provides, it has been found that condensation catalysts, such as strong organic acids, weak Lewis acids, weak organic bases and metal chelates can also be used in the preparation of the novel silicone pressure-sensitive adhesive. Another preferred class of condensation catalyst is the strong organic acids having pKas of less than about 3 and the anhydrides and ammonium salts thereof described in U.S. Pat. No.

5,286,815. Examples of useful strong organic acids and derivatives include trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

The pressure-sensitive adhesives of the present invention can be used in the manufacture of a wide variety of adhesive-coated articles, including pressure-sensitive adhesive coated sheets and tapes (e.g., permanent tapes and transfer tapes), generally comprising a backing layer (typically a flexible paper or polymeric material) with the pressure-sensitive adhesive disposed on one or both of the opposed major surfaces of the backing layer. A temporary removable release liner may be used to protect an exposed adhesive layer from dirt and other contaminants and is removed before using the adhesive article. In the case of adhesive articles in which the pressure-sensitive adhesive is disposed on only one of the major surfaces of the backing layer, the non-adhesive bearing surface of the backing layer may be provided with a low adhesion backsize to facilitate winding the adhesive article into roll form so as to prepare, for example, a roll of tape.

A transfer tape can be made by coating the pressure-sensitive adhesive composition between two temporary, removable liners both of which include a release coating and with the adhesive in contact with the release coating. The release liners often comprise a clear polymeric material such as polyolefin or polyester that is transparent to ultraviolet radiation.

Any release liner suitable for use with silicone adhesives can be used in conjunction with the invention such as those described in European Patent Publication No. 433070, European Patent Publication No. 378420, European Patent Publication No. 311262, and U.S. Pat. No. 4,889,753. Commercially available liners and compositions include Dow Corning SYL-OFF Q2-7785 fluorosilicone release coating, available from Dow Corning Corp., Midland, Mich.; X-70-029NS fluorosilicone release coatings available from Shin-Etsu Silicones of America, Inc., Torrance, Calif.; and S TAKE-OFF 2402 fluorosilicone release liner from Release International, Bedford Park, Ill.

A particularly preferred release liner comprises a backing bearing the fluorinated polyether release coating described below and which is prepared using a reactive silane functional fluorinated polyether and the acid generating material compositions of the present invention.

Reactive Silane Functional Polyacrylates and Fluorinated Polyacrylates

Reactive silane functional polyacrylates can be prepared by copolymerizing a silane functional free-radically reactive monomer with free-radically reactive comonomers and can be obtained, for example, as emulsion, suspension, solvent solution, or bulk polymerization products using, polymerization methods described in *Principles of Polymerization*, 3rd ed. (G. Odian, Wiley-Interscience : New York, 1981, pp. 286–296).

Useful silane-functional free-radically reactive monomers include, for example, 3-(methacryloxy)propyl trimethoxysilane, 3-acryloxypropyl trimethoxysilane, 3-(methacryloxy)propyltriethoxysilane, 3-(methacryloxy)propylmethyldimethoxysilane, 3-(acryloxypropyl)methyldimethoxysilane, 3-(methacryloxy)propyldimethylethoxysilane, 3-(methacryloxy)methyltriethoxysilane, 3-(methacryloxy)methyltrimethoxysilane, 3-(methacryloxy)propyldimethylethoxysilane, 3-methacryloxypropenyl trimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof. Of these, 3-(methacryloxy)propyl trimethoxysilane, 3-acryloxypropyl trimethoxysilane, 3-(methacryloxy)propylmethyldimethoxysilane and 3-(methacryloxy)propyldimethylethoxysilane are preferred.

In general, the free-radically reactive comonomers employed in preparing the reactive silane functional polyacrylates are vinyl-functional and include, for example, acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, and methacrylamide and derivatives thereof.

Useful acrylic and methacrylic acid esters include acrylate and methacrylate esters having straight chain alkyl, branched alkyl or cycloalkyl groups, each having from about 1 to about 24 carbon atoms. Examples include methyl acrylate, methyl methacrylate, isooctyl acrylate, 4-methyl-2-pentyl acrylate, 2-methylbutyl acrylate, isoamyl acrylate, sec-butyl acrylate, n-butyl acrylate, tert-butyl acrylate, isobornyl acrylate, butyl methacrylate, ethyl acrylate, dodecyl acrylate, octadecyl acrylate, behenyl acrylate, cyclohexyl acrylate and mixtures thereof.

Acrylate and methacrylate esters having substituted alkyl groups can also be used in the preparation of reactive silane functional polyacrylates. A preferred class of substituted alkyl acrylates and methacrylates are those that contain fluoroalkyl groups. A fully-fluorinated alkyl group is preferred, but hydrogen and chlorine substituents and/or catenary heteroatoms (such as carbon bonded to oxygen, divalent or hexavalent sulfur and nitrogen atoms) can also be present. Examples of useful fluoroalkyl or perfluoropolyether substituted acrylate and methacrylate comonomers include perfluorocyclohexyl carbinol methacrylate, perfluorocyclopentyl carbinol methacrylate, N-methylperfluorooctanesulfonamidoethyl acrylate, N-ethylperfluorooctanesulfonamidoethyl acrylate, 1H,1H-pentadecafluorooctyl methacrylate, 1H,1H-pentadecafluorooctyl acrylate, 2-(perfluorooctyl)ethyl methacrylate, and adducts of hydroxyethylmethacrylate and hexafluoropropylene trimer.

Other vinyl-functional comonomers that are readily copolymerizable with the silane functional free-radically reactive monomer include itaconic acid, crotonic acid, maleic acid, fumaric acid, sulfoethyl methacrylate, N-vinyl pyrrolidone, N-vinyl caprolactam, t-butyl acrylamide, N-octyl acrylamide, vinyl acetate, vinyl propionate, styrene, alpha-methyl styrene, mixtures thereof, and the like.

Free-radically copolymerizable macromonomers may also be used in the polymerizable compositions of the present invention. Examples of such macromonomers include acrylate-terminated poly(methyl methacrylate), methacrylate-terminated poly(methyl methacrylate), p-styryl-terminated poly(methyl methacrylate), acrylate-terminated polystyrene, methacrylate-terminated polystyrene, acrylate-terminated poly(ethylene oxide), methacrylate-terminated poly(ethylene oxide), acrylate-terminated poly(ethylene glycol), methacrylate-terminated poly(ethylene glycol), methoxy poly(ethylene glycol) methacrylate, butoxy poly(ethylene glycol) methacrylate, methacrylate-terminated polysiloxanes, acrylate terminated polysiloxanes, and mixtures thereof. These macromonomers are preferred because they are easily prepared using ionic and chain transfer polymerization techniques and are also highly effective in providing grafted oligomeric and polymeric segments to silane-functional polyacrylates.

The types and proportions of free-radically reactive comonomers and macromonomers used to prepare the reactive silane functional polyacrylate depend on the desired properties and applications of the polymerized product. For example, if polymerization products having, pressure-sensitive adhesive properties are required, then the monomers should be combined by well-known formulating techniques that result in products possessing sufficient viscoelastic and morphological properties to demonstrate adequate tack, peel and cohesive strength. For such pressure-sensitive adhesives, preferred formulations include a major portion of n-butyl acrylate, isooctyl acrylate, isononyl acrylate, isoamyl acrylate, isodecyl acrylate, or 2-ethylhexyl acrylate, or mixtures thereof, optionally a minor portion of acrylic acid, methacrylic acid, n-vinyl pyrrolidone, vinyl acetate, styrene, acrylate-terminated polystyrene, methacrylate-terminated polystyrene, or mixtures thereof, and small amounts (from about 0.05 wt % to about 3 wt %) of silane-functional free-radically reactive monomers.

Reactive silane functional fluorinated polyacrylates may be prepared from fluorinated free-radically polymerizable monomers, silane functional free-radically reactive monomers, and optionally other free-radically reactive comonomers. These materials are characterized by low surface energies and, as such, are useful in combination with acid generating materials to provide soil and/or water-resistant coatings due to their ability to repel both oil and water. These surface properties also make these materials useful as protective coatings for automobiles, boats, wall coverings, floors, airplanes and buildings. Their inherent low surface energies additionally make these materials suitable as release coatings for use with pressure-sensitive adhesives and as release surfaces used in the manufacture of molded plastic articles. Typical formulations contain about 20 to about 80 wt % fluorinated free-radically polymerizable monomers, about 20 to about 50 wt % silane functional free-radically reactive monomers, and, when used, 1 to about 30 wt % other free-radically reactive comonomers.

Reactive Silane Functional Polyolefins

Reactive silane functional polyolefins can be produced from commercially available starting materials by any of several methods. One useful method involves copolymerizing an ω-alkenylhalosilane, such as vinyl trichlorosilane, an ω-alkenylalkoxysilane such as vinyltriethoxysilane, or an ω-alkenylacyloxysilane, such as vinyltriacetoxysilane, with an α-olefin monomers using a Ziegler-Natta catalyst to produce a copolymer containing halosilyl or alkoxysilyl sidechains. When an ω-alkenylhalosilane is used, the copolymer can then be reacted with an alkyl alcohol to convert the halosilane groups to alkoxysilanes.

Alternatively, reactive silane functional polyolefins can be prepared by copolymerizing α-olefin monomers with non-conjugated linear, mono-, or polycyclic diene monomers using a Ziegler-Natta catalyst to produce an intermediate copolymer containing pendant and/or terminal ethylenic unsaturation. These pendant and/or terminal unsaturated groups can then be reacted with mono-, di- and tri-alkoxysilanes or acyloxysilanes using platinum hydrosilation catalysts to provide reactive silane functional polyolefins. Such ethylenic functional polyolefins can also be functionalized with reactive silane groups by adding a mercaptoalkylalkoxysilane, such as mercaptopropyltriethoxysilane, to the intermediate polyolefin in the presence of a thermal initiator or a photoinitiator.

Alpha-olefins that are typically used in the preparation described above include those having 2-14 carbon atoms. Representative examples include ethylene, propylene, 1-butene, 1-pentene, 1-hexene, 1-heptene, 1-octene, 1-tetradecene; branched olefins such as 3-methyl-1-butene, 3,3-dimethyl-1-butene, 4-methyl-1-pentene and 3-ethyl-1-pentene; cyclic olefins such as cyclopentene, cyclohexene, 3-methyl cyclopentene, 4-n-butyl cyclohexene, bicyclo [2.2.1]hept-2-ene, 1,7,7-trimethylbicyclo[2.2.1]hept-2-ene (bornylene)bicyclo[3.2.0-]hept-2-ene, bicyclo[3.2.0]hept-6-ene, bicyclo[2.2.0]oct-2-ene, and tricyclo[3.2.2]non-6-ene; and aromatic olefins such as allylbenzene, 1H-indene, 3-methyl-H-indene, and styrene.

Dienes that can be used include those having 5 to 14 carbon atoms. Representative examples include 1,4-pentadiene, 1,5-hexadiene, 1,6-heptadiene, 1,7-octadiene, 1,13-tetradecadiene, 1,19-eicosadiene, and the like; cyclic dienes such as 1,4-cyclohexadiene, bicyclo[2.2.1]hept-2,5-diene, bicyclo[2.2.2]oct-2,5-diene, 4-vinylcyclohex-1-ene, bicyclo[2.2.2]oct-2,6-diene, 1,7,7-trimethylbicyclo[2.2.1] hept-2,5-diene, dicyclopentadiene, 5-allylbicyclo[2.2.1] hept-2-ene, 1,5-cyclooctadiene; and aromatic dienes such as 1,4-diallylbenzene, 4-allyl-1H-indene and the like.

Reactive silane functional polyolefins can be formulated according to U.S. Pat. Nos. 5,227,442; 5,296,561; and 5,397,648 to provide pressure-sensitive adhesives.

Reactive Silane Functional Polyethers

Reactive silane functional polyethers can be prepared by reacting polyoxyalkylene glycols or polyols with allylbromide in the presence of sodium hydride to form linear or branched, fluorinated or hydrocarbon, allyl-terminated polyethers. The polyethers are further hydrosilated in the presence of a platinum catalyst with alkoxysilanes (such as triethoxysilanes, diethoxymethylsilanes, methyldimethoxysilane, trimethoxysilanes, and ethoxydimethysilanes) to give alkoxysilane-terminated polyethers. Methods of preparing such silane-modified polyethers are described in U.S. Pat. Nos. 3,971,751, 4,444,974, and 4,507,469.

Preferred reactive silane functional polyethers are methyldimethoxysilane-functional polypropylene oxides having molecular weights of about 7500–8500 that are commercially available from Union Carbide Chemicals and Plastics Co. (S. Charleston, W. Va.) and from Kanegafuchi under the trade designations SILMOD and KANEKA MS POLYMER, respectively. In addition to their ready availability, these silane functional polyethers are also preferred due to their relatively low viscosity and the high flexibility and moisture resistance provided by their polypropylene oxide backbone.

Reactive silane functional fluorinated polyethers can also be cured according to the present invention. The fluorinated polyether portion of these reactive silane compounds comprises perfluoroalkylene oxide groups having one to six carbon atoms or are perfluoroether portions having combinations of such groups. Reactive silane functional fluorinated polyethers having one or more amide-linkages can preferably be prepared by combining ester-, acyl-, or acid-terminated poly(perfluoro alkylene oxide) prepolymers with aminoalkyl or aminoaryl alkoxysilane reactants. Such linear amide-linked reactive silane functional fluorinated polyethers can be prepared as described in U.S. Pat. No. 4,094,911. Similarly, urethane-linked hydroxy-functional poly (perfluoroalkylene oxide)prepolymers can be reacted with isocyanate-terminated reactive silanes such as isocyanatopropyl triethoxysilane. Similarly, allyloxy-terminated poly (perfluoroalkylene oxide) prepolymers can be hydrosilated to give reactive silane functional fluorinated polyethers.

When cured according to the methods of the present invention, these polyethers can be used in adhesive, release coating, protective coating, and sealant formulations.

Reactive Silane Functional Polyurethanes

Reactive silane functional polyurethanes can be prepared, in a typical approach, by reacting isocyanate-terminated polyurethane prepolymers with active hydrogen functional reactive silane monomers. The isocyanate-terminated polyurethane prepolymers useful in the present invention are prepared by reacting a molar excess of organic polyisocyanate with one or more polyols, as is well known in the art. A summary of urethane polymer chemistry and technology can be found, for example, in Polyurethanes: Chemistry and Technology, Saunders and Frisch, Interscience Publishers (New York, 1963 (Part I) and 1964 (Part II)).

Any suitable organic polyisocyanate, either aliphatic, cycloaliphatic, araliphatic or aromatic, may be used either singly or in mixtures of two or more. Either aromatic or aliphatic isocyanates are suitable, the aliphatic isocyanates generally giving softer polymers and coatings having better light stability than the aromatic compounds. The aromatic compounds are more economical and generally useful. Isocyanates containing more than two isocyanate groups in the molecule can be included without measurable changes in the characteristics of the resulting polymer; diisocyanates are preferred. Suitable organic polyisocyanates include m-phenylene diisocyanate, p-phenylene diisocyanate, m-tetramethyl xylylene diisocyanate, p-tetramethyl xylylene diisocyanate, 2,4-tolylene diisocyanate, 2,6-tolylene diisocyanate, 4,4'-diphenylmethane diisocyanate, benzidine diisocyanate, naphthalene-1,5-diisocyanate, hexamethylene diisocyanate, and other alkylene diisocyanates, 4,4',4"-triphenylmethane triisocyanate, decamethylene diisocyanate, polyphenylmethylene polyisocyanates that are produced by phosgenation of aniline/formaldehyde condensation products containing up to about four aromatic rings, dianisidine diisocyanate, xylylene diisocyanate, bis(2-isocyanatoethyl)fumarate, bis(2-isocyanatoethyl)cyclohex-4-ene-1,2-dicarboxylate, bis(2-isocyanatoethyl)carbonate and many other organic polyisocyanates known in the art.

In producing the isocyanate-terminated polyurethane prepolymers useful in the present invention, one or more polyhydroxy compounds or polyols can be employed in the reaction with the organic polyisocyanate. Illustrative polyhydroxy compounds include the following classes of compounds:

a. lactone polyols and the alkylene oxide adducts thereof;

b. polyester polyols, and the alkylene oxide adducts thereof;

c. polyoxyalkylene polyols and polyoxycycloalkylene polyols and the alkylene oxide adducts thereof; and d. polytetramethylene glycols.

"Lactone polyols" are prepared by reacting a lactone such as epsilon-caprolactone or a mixture of epsilon-caprolactone and an alkylene oxide with a polyfunctional initiator such as polyhydric alcohol. The term "lactone polyols" also includes various "copolymers" such as lactone copolyesters, lactone polyester/polycarbonates. Lactone polyester/polyethers, lactone polyester/polyether/polycarbonates, and the like.

The term "alkylene oxide" includes, for example, ethylene oxide, 1,2-epoxypropane, 1,2-epoxybutane, 2,3-epoxybutane, isobutylene oxide, epichlorohydrin, and the like and mixtures thereof.

"Polyester polyols" are esterification products which range from liquids to non-crosslinked solids, i.e., solids that are soluble in many of the more common inert normally liquid organic media, and that are prepared by the reaction of polycarboxylic acids, their anhydrides, their esters or their halides, with a stoichiometric excess of a polyol. Illustrative of the polycarboxylic acids that can be employed to prepare the polyester polyols preferably include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, and the like, while the esterification reaction is well known in the art.

"Polyoxyalkylene polyols" include alkylene oxide adducts of, for example, water, ethylene glycol, diethylene glycol, propylene glycol, dipropylene glycol, glycerol, 1,2, 6-hexanetriol, 1,1,1-trimethylol ethane or propane, pentaerythritol, and the like. The alkylene oxides employed in producing polyoxyalkylene polyols normally have from 2 to 4 carbon atoms. Ethylene oxide, propylene oxide and mixtures of propylene oxide with ethylene oxide are preferred. Such polyalkylene polyols are well known in the art.

Another useful class of polyols is the polyoxytetramethylene glycols, which are prepared by polymerizing tetrahydrofuran in the presence of acidic catalyst. Preferred polyols are the polyester diols and polyoxyalkylene diols.

Triols, tetrols, triisocyanates, etc., can be used in making the polyurethanes used in the invention to promote small amounts of cross-linking in the polyurethane-polyurea backbone so as to improve tensile strength and decrease coldflow.

When an isocyanate-terminated prepolymer is used, the prepolymer is subsequently reacted with an isocyanate reactive alkoxysilane or acetoxysilane such as aminopropyl trimethoxysilane, aminopropyl triethoxysilane, aminopropyl methyldimethoxysilane, and aminopropyl methyldiethoxysilane to form the reactive silane functional polyurethane. Alternatively, reactive silane functional polyurethanes can be provided from hydroxy-terminated prepolymers (prepared by combining a molar excess of hydroxy radicals compared to isocyanate radicals) and reacting the prepolymeric product with isocyanate-terminated reactive silanes such as isocyanatopropyl triethoxysilane.

Acid Generating Material

Upon activation, the acid generating material liberates an acid that initiates and accelerates curing (i.e., crosslinking) of the moisture-curable composition. In order to facilitate more rapid curing, the liberated acid preferably has a pKa of less than about 3, more preferably less than about 1. Activation may be accomplished by irradiating the composition with, for example, ultraviolet, visible light, electron beam or microwave radiation. While heat radiation may be used to activate the acid generating material, the compositions of the invention preferably do not require this and thereby can avoid undesirable damage to heat sensitive substrates. However, if heat activation is used, it is preferred to use microwave or infrared radiation as the heat source. Moisture required for the initial hydrolysis reaction of the curing mechanism may be obtained from, for example, the substrate, the composition itself, or, most commonly, atmospheric humidity. The acid generating material is typically present in an amount of about 0.5 to about 20 parts by weight, based on 100 parts by weight reactive silane functional compounds.

A variety of acid generating materials may be used in the practice of the invention except for ammonium salts such as disclosed in U.S. Pat. No. 5,286,815 that generate an amine that may inhibit the curing reaction of the cure-on-demand composition of this invention. Thus, acid generating materials of the present invention are free of ammonium salts. Particularly desired acid generators for use in this invention are those that are capable of releasing an acid upon exposure to ultraviolet or visible light or upon exposure to electron beam irradiation. For example, the acid generating material may comprise a sulfonate ester having the following general structure:

Structure VI

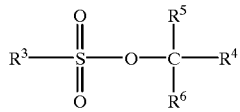

$R^3$ is an alkyl or fluoroalkyl group, $R^4$ is hydrogen or an alkyl group, and $R^5$ and $R^6$ are alkyl groups (which may be the same or different) or hydrocarbon-containing radicals that cooperate to form a cyclic structure. A particularly preferred sulfonate ester is one wherein $R^5$ and $R^6$ together with the carbon to which they are attached form a cyclohexane ring and $R^4$ is hydrogen.

The acid generating material may also comprise a carboxylate ester having the following structure:

Structure VII

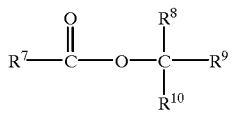

$R^7$ is a fluoroalkyl group, preferably a perfluoroalkyl group having 2 to 7 carbon atoms, and $R^8$ and $R^{10}$ are alkyl groups (which may be the same or different) or hydrocarbon-containing radicals that cooperate to form a cyclic structure. $R^9$ is an alkyl group. Particularly preferred carboxylate esters include those wherein $R^8$ and $R^9$ together with the carbon atom to which they are attached form a cyclohexane ring, $R^{10}$ is a lower alkyl such as methyl, and $R^7$ is a perfluoroalkyl group such as $C_7F_{15}$. Sulfonate and carboxylate esters typically require a heating step (50° C. to 100° C.) to liberate the acid.

Preferably, the acid generating material comprises an onium salt because of their capacity to simultaneously generate a strong acid and an energetic free radical when activated. These catalysts are known for use in the chain polymerization of epoxide, vinyl ether, olefinic and other cationically-curable groups to produce, for example, protective and release coatings (see, for example, U.S. Pat. Nos. 3,981,897 and 4,069,054, and Belgian Patent No. 837,782), but their utility in catalyzing the condensation of reactive silane compounds having silanes as the only acid-curable group has not been previously recognized.

Onium salts suitable for use in the present invention are preferably sulfonium or iodonium salts having the following structure:

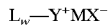

Structure VIII

L is an aryl or substituted aryl group; w is an integer from 2 to 4; Y is sulfur or iodine; M is a Group IIIA, IVA or VA element from the Periodic Table of the Elements; and X is a sulfate, tosylate, alkyl sulfonate, fluoroalkyl sulfonate, fluoroalkyl, or a perfluorinated aryl group.

Examples of useful sulfonium salts include:
triphenylsulfonium tetrafluoroborate;
triphenylsulfonium tetrakis(pentafluorobenzyl)borate;
methyldiphenylsulfonium tetrafluoroborate;
methyldiphenylsulfonium tetrakis(pentafluorobenzyl)borate;
dimethylphenylsulfonium hexafluorophosphate;
triphenylsulfonium hexafluorophosphate;
triphenylsulfonium hexafluoroantimonate;
diphenylnaphthylsulfonium hexafluoroarsenate;
tritolysulfonium hexafluorophosphate;
anisyldiphenylsulfonium hexafluoroantimonate;
4-butoxyphenyldiphenylsulfonium tetrafluoroborate;
4-butoxyphenyldiphenylsulfonium tetrakis(pentafluorobenzyl)borate;
4-chlorophenyldiphenylsulfonium hexafluoroantimonate;
tris(4-phenoxyphenyl)sulfonium hexafluorophosphate;
di(4-ethoxyphenyl)methylsulfonium hexafluoroarsenate;
4-acetylphenyldiphenylsulfonium tetrafluoroborate;
4-acetylphenyldiphenylsulfonium tetrakis(pentafluorobenzyl)borate;
tris(4-thiomethoxyphenyl)sulfonium hexafluorophosphate;
di(methoxysulfonylphenyl)methylsulfonium hexafluoroantimonate;
di(methoxynaphthyl)methylsulfonium tetrafluoroborate;
di(methoxynaphthyl)methylsulfonium tetrakis(pentafluorobenzyl)borate;
di(carbomethoxyphenyl)methylsulfonium hexafluorophosphate;
(4-octyloxyphenyl)diphenylsulfonium tetrakis(3,5-bis-trifluoromethyl phenyl)borate;
tris(dodecylphenyl)sulfonium tetrakis(3,5-bis-trifluoromethyl phenyl)borate;
4-acetamidophenyldiphenylsulfonium tetrafluoroborate;
4-acetamidophenyldiphenylsulfonium tetrakis(pentafluorobenzyl)borate;
dimethylnaphthylsulfonium hexafluorophosphate;
trifluoromethyldiphenylsulfonium tetrafluoroborate;
trifluoromethyldiphenylsulfonium tetrakis(pentafluorobenzyl)borate;
phenylmethylbenzylsulfonium hexafluorophosphate;
10-methylphenoxathiinium hexafluorophosphate;
5-methylthianthrenium hexafluorophosphate;
10-phenyl-9,9-dimethylthioxanthenium hexafluorophosphate;
10-phenyl-9-oxothioxanthenium tetrafluoroborate;
10-phenyl-9-oxothioxanthenium tetrakis(pentafluorobenzyl)borate;
5-methyl-10-oxothianthrenium tetrafluoroborate;
5-methyl-10-oxothianthrenium tetrakis(pentafluorobenzyl)borate; and
5-methyl-10,10-dioxothianthrenium hexafluorophosphate;

Examples of useful iodonium salts include: di(dodecylphenyl)iodonium hexafluoroantimonate, di(dodecylphenyl)iodonium triflate; diphenyliodonium bisulfate, 4,4'-dichlorodiphenyliodonium bisulfate; 4,4'-dibromodiphenyliodonium bisulfate; 3,3'-dinitrodiphenyliodonium bisulfate; 4,4'- dimethyldiphenyliodonium bisulfate; 4,4'-bissuccinimidodiphenyliodonium bisulfate; 3-nitrodiphenyliodonium bisulfate; 4,4'-dimethoxydiphenyliodonium bisulfate, bis(dodecylphenyl)iodonium tetrakis(pentafluorophenyl)borate; (4-octyloxyphenyl)phenyliodonium tetrakis(3,5-bis-trifluoromethyl phenyl)borate; (tolylcumyl)iodonium tetrakis(pentafluorophenyl)borate; $[(CH_3C_6H_4)_2I]^+[C(SO_2CF_3)_3]^-$ as disclosed in U.S. Pat. No. 5,554,664; $(C_6H_5)_2$ I—$B(C_6F_5)_4$ as disclosed in U.S. Pat. No. 5,514,728; and those disclosed in U.S. Pat. No. 5,340,898. A particularly preferred onium salt is di(dodecylphenyl)iodonium hexafluoroantimonate.

Some acid generating materials can impart electroconductive properties to the compositions, as may be required for certain applications. For example, when electrostatically-assisted coatable compositions are prepared, the composition may need to have particular properties (e.g., electroconductivity). Table A illustrates typical properties desired for certain electrostatically-assisted coatable compositions. Such compositions are useful when coating using, for example, electrostatic spray, electrospray, and continuous liquid applications with electrostatic assistance (e.g., by roll coating, etc.).

TABLE A

| Coating Method | Preferred Range | | Most Preferred Range | |
|---|---|---|---|---|
| | Brookfield Viscosity $\eta$ (mPa · s) | Electro-conductivity $\delta$ (Siemens/m) | Brookfield Viscosity $\eta$ (mPa · s) | Electro-conductivity $\delta$ (S/m) |
| Electrospray | 1 to 100 | $10^{-6}$ to $10^{-3}$ | 1 to 50 | $10^{-5}$ to $10^{-4}$ |
| Electrostatic Spraying | 1 to 500 | $10^{-5}$ to $10^{-1}$ | 1 to 250 | $10^{-5}$ to $10^{-1}$ |
| Continuous Liquid with Electrostatic Assistance | 1 to 1000 | $10^{-7}$ to $10^{-1}$ | 1 to 500 | $10^{-7}$ to $10^{-1}$ |

Particularly preferred acid generating salts useful in such compositions include (4-octyloxyphenyl)diphenylsulfonium tetrakis(3,5-bis-trifluoromethyl phenyl)borate, tris(dodecylphenyl)sulfonium tetrakis(3,5-bis-trifluoromethyl phenyl)borate; bis(dodecylphenyl)iodonium tetrakis(pentafluorophenyl)borate; (4-octyloxyphenyl)phenyliodonium tetrakis(3,5-bis-trifluoromethyl phenyl)borate; and (tolylcumyl)iodonium tetrakis(pentafluorophenyl)borate. When such acid generating salts are used, they can provide sufficient electroconductivity for electrostatically-assisted coating. Advantageously, further electroconductivity enhancers are not typically required when using such salts, although they may also be used in conjunction with these preferred acid generating salts.

Onium salts are typically activated using ultraviolet radiation. Because of this, they can be advantageously employed in applications involving heat-sensitive substrates. Optionally, a sensitizer may supplement the onium salt to accelerate the liberation of the acid catalyst and typical amounts are about 0.03 to about 0.1 parts by weight, based on 100 parts by weight reactive silane functional compound. Examples of suitable sensitizers include those described in Chapter 13 of *Radiation Curing in Polymer Science and Technology*, Vol. 2, edited by Fouassier and Rabek, Elsevier Science Publishers LTD, 1993. 2-isopropylthioxanthone is a particularly preferred sensitizer for use with di(dodecylphenyl)iodonium hexafluoroantimonate.

Moisture Curable Compositions

The moisture curable compositions of the invention may be readily prepared by dissolving an inherently soluble acid generating material in the reactive silane functional compound at room temperature with mixing as needed. However, dissolution of the acid generating material may be promoted by employing a combination of different reactive silane functional compounds, in particular by employing non-polymeric reactive silane functional compounds. For example, Structure I species where the A radical is nonpolymeric such as tetraethoxysilane, diethoxytetramethyldisiloxane, octyl triethoxysilane, octadecyl triethoxysilane, and substituted alkyl containing reactive silane functional compounds such as e.g. fluorinated or perfluorinated alkyl containing reactive silane functional compounds, in particular perfluorinated alkyl containing triethoxysilane or perfluorinated alkyl containing trimethoxysilane, can be used in combination with polymeric reactive silane functional compounds to enhance the solubility and promote the dissolution of certain acid generating materials, such as iodonium salts, in the curable compositions. Such compounds are hereinafter referred to as "reactive diluents." In such preferred fluorinated or perfluorinated alkyl containing compounds, linking group G, when present, can include amido, urea, urethane, sulfonamido, ether or ester linkages.

Reactive diluents may also be added to compositions to tailor physical properties for a particular application. For example, the inclusion of mercapto-containing reactive silane functional compounds may enhance adhesion in adhesive formulations; fluorinated alkyl groups, silanol-terminated polydiorganosiloxane, and silanol-terminated oligodiorganosiloxane may provide low surface energy materials; pyrene-derivatives may facilitate monitoring of on-line coating weight using phosphorescent detectors; and alkoxysilane (groups may provide variations in release coating characteristics in release coatings.

A variety of other additives may also be used in the compositions, depending on the particular application. In general, these additives include pigments, fillers, tackifiers, plasticizers, UV-stabilizers, anti-oxidants, electroconductivity enhancers, and the like.

One or more electroconductivity enhancers can be added to the compositions of the present invention, most typically when electrostatically-assisted coating methods are employed. Electroconductivity enhancers enhance the electroconductivity required to effectively deliver these compositions using such methods. In certain circumstances, the addition of an electroconductivity enhancing additive is desirable or even necessary. For example, although certain acid generating materials may provide the requisite electroconductivity for electrostatically-assisted coating, it may be desirable to further enhance the electroconductivity of the compositions. Alternatively, the acid generating material may not contribute to the electroconductivity of the composition. In that case, an electroconductivity enhancer is usually required. Electroconductivity enhancers may also be desirable for certain applications because they enable one to independently control the concentration of materials that are acid-generating from those that are electroconductivity enhancing.

In general, electroconductivity enhancing additives are non-volatile (i.e., their vapor pressures are 1 kPa or less at 25° C., preferably 0.5 kPa or less at 25° C., and more preferably 0.1 kPa or less at 25° C.). Preferably, the electroconductivity enhancing additives do not decompose to form volatiles, or become heat- or water-extractable at any time during processing or from the final product. Furthermore, the electroconductivity enhancers should not prevent polymerization of the composition. When using spray coating methods, such as electrospray or electrostatic spray for coating compositions that include electroconductivity enhancers, it is also desirable for the electroconductivity enhancers to be soluble in the other components of the composition.

Migrating electroconductivity enhancers may undesirably interfere with the final product's properties. Thus, preferably, the selected electroconductivity enhancer copolymerize with the rest of the composition. However, it is not necessary that the electroconductivity enhancer copolymerizes with the rest of the composition. For example, if the electroconductivity enhancer is added in a small quantity and is physically trapped within the cured composition (i.e., it does not migrate to adjacent layers, evaporate, or become extractable when heated or exposed to water), the electroconductivity enhancer need not copolymerize.

Preferably, the electroconductivity enhancers increase the composition's electroconductivity when added in relatively low amounts. Typically, about 0.001 weight percent to about 10 weight percent and preferably from about 0.001 weight percent to about 1 weight percent of the electroconductivity enhancer based on total weight of the reactive silane functional compounds is added to the compositions of the present invention.

Electroconductivity enhancers useful in the present invention include salts having an organic or inorganic cation and a bulky, carbon-containing, non-coordinating, organophilic anion to promote dissolution and ionic dissociation of the salt in organic monomers. Preferably the anion has a formula weight of at least 200 kg/kmol.

Cations that are particularly useful in the electroconductivity enhancers include alkali metal ions and onium groups having the general formula:

$$[R_n B^{30}]$$

wherein at least one R is a hydrocarbon having from about 4 to about 18 carbon atoms. Preferably, each other R is a hydrogen or a hydrocarbon having from about 4 to about 18 carbon atoms. Most preferably, each R is a hydrocarbon. B is a group VA, VIA, or VIIA element of the Periodic Table of Elements and n is an integer from 2 to 4.

Examples of these cations include alkyl-substituted ammonium, alkyl-substituted phosphonium, diaryl iodonium and its alkylated derivatives, triaryl sulfonium and its alkylated derivatives, and the like. Preferred onium groups include tetraoctyl ammonium, tetrabutyl ammonium, tetraoctyl phosphonium, tetrabutyl phosphonium, tris (dodecylphenyl)sulfonium, triphenyl sulfonium, bis (octylphenyl) iodonium, bis(dodecylphenyl)iodonium, diphenyl iodonium, and the like.

Another class of useful cations includes alkyl-substituted imidazolium and alkyl substituted pyridinium groups. Examples of these cations include dodecyl pyridinium and (2-methyl-5-ethyl)imidazolium cations. Useful anions include, but are not restricted to, alkyl, cycloalkyl and aryl sulfonates, fluoroalkylsulfonylimides, fluoroalkylsulfonylmethides, arylborates, carborane anions, and metallocarborane anions. Also, in certain cases, boron catecholates are useful. Such useful anions are described in PCT Publication No. WO 97/35,930, incorporated herein by reference. Preferably the anions are halogen-substituted and most preferably the halogen is fluorine. Such fluorinated anions are particularly useful in enhancing the electroconductivity of fluorinated moisture curable compositions.

Thus, electrostatically-assisted coatable, cure-on-demand, moisture-curable compositions of the present invention may comprise:
(a) a compound comprising molecules bearing reactive silane functional groups; and
(b) an acid generating material which does not comprise an ammonium salt and is electroconductivity enhancing;

wherein the reactive silane functional groups are the only acid curable groups present in the composition. Preferred compositions are electrosprayable.

Alternatively, electrostatically-assisted coatable, cure-on-demand, moisture-curable compositions of the present invention may comprise:
(a) a compound comprising molecules bearing reactive silane functional groups; and
(b) an acid generating material which does not comprise an ammonium salt; and
(c) an electroconductivity enhancer;

wherein the reactive silane functional groups are the only acid curable groups present in the composition. Preferred compositions are electrosprayable.

Other preferred curable compositions comprise:
(a) 0 to about 100 parts by weight of one or more Structure I compounds wherein A is a polymeric radical;
(b) 0 to about 100 parts by weight of one or more Structure I compounds wherein A is a non-polymeric radical, the sum of (a) and (b) being 100 parts by weight;
(c) about 0.5 to about 20 parts by weight of an onium salt based on 100 parts by weight of (a) plus (b); and
(d) about 0.03 to about 0.1 parts by weight of a sensitizer based on 100 parts by weight (a) plus (b).

Particularly preferred curable compositions for providing release materials comprise:
(a) about 20 to about 80 parts by weight of a reactive silane functional compound according to Structure I wherein G is —CH$_2$CH$_2$—; m is 6; p is 3; R$^1$ is —CH$_2$CH$_3$; and A is Structure III;
(b) about 20 to about 80 parts by weight of diethoxytetramethyldisiloxane wherein the sum of (a) and (b) equals 100 parts by weight;
(c) about 0.5 to about 20 parts by weight of an onium salt based on 100 parts by weight of (a) plus (b); and
(d) about 0.03 to about 0.1 parts by weight of a sensitizer based on 100 parts by weight (a) plus (b).

Another particularly preferred composition for providing release materials comprises:
(a) about 20 to about 80 parts by weight of a reactive silane functional compound according to Structure I wherein G is —CH$_2$CH$_2$—; m is 6; p is 1; R$^1$ is —CH$_2$CH$_3$; R$^2$ is —CH$_3$; and A is Structure III;
(b) about 20 to about 80 parts by weight of diethoxytetramethyldisiloxane;
(c) about 0.5 to about 20 parts by weight of octadecyl triethoxysilane wherein the sum of (a)+(b)+(c) equals 100 parts by weight;
(d) about 0.5 to about 20 parts by weight of an onium salt based on 100 parts by weight of (a)+(b)+(c); and
(e) about 0.03 to about 0.1 parts by weight of a sensitizer based on 100 parts by weight (a)+(b)+(c).

Particularly preferred curable compositions for protective coatings comprise:
(a) about 20 to about 100 parts by weight of a reactive silane functional polyfluoroacrylate compound that is obtainable by the polymerization a monomer blend comprising about 20 to about 80 percent by weight fluorinated free-radically reactive acrylate monomers and about 80 to about 20 percent by weight silane functional free-radically reactive monomers;

(b) about 0 to about 80 parts by weight of a reactive diluent, wherein the sum of (a) and (b) equals 100 parts by weight;

(c) about 0.5 to about 20 parts by weight of an onium salt based on 100 parts by weight of (a) plus (b); and (d) about 0.03 to about 0.1 parts by weight of a sensitizer based on 100 parts by weight (a) plus (b).

Coated Substrates

The compositions of the present invention are stable against ambient moisture before the acid generating material is activated. Therefore, any conventional coating technique can be used to apply the compositions to target substrates without the need to take precautionary measures to avoid the intrusion of moisture into the composition. Useful coating techniques include brush, roll, spray, spread, wire, gravure, transfer roll, air knife, or doctor blade coating. Electrostatically-assisted variations of these coating techniques may also be used. For example, electrostatically-assisted spray, such as electrostatic spray or electrospray, and other electrostatically-assisted coating methods, as described in PCT Publication No. WO 97/35,930, entitled "Free-Radically Polymerizable Compositions Capable of Being Coated By Electrostatic Assistance" and U.S. Pat. No. 5,683,798 to Seaver et al. (incorporated herein by reference) may be utilized. The ratio of polymer to reactive diluent can be adjusted to provide the required coating viscosity. Generally, by adding reactive diluent the viscosity will decrease whereas increasing the amount of polymer will increase the viscosity. Additionally or alternatively, a solvent can added to adjust the viscosity. In case of solventless processing however, the viscosity is preferably adjusted by selecting the amount of reactive diluent or by adjusting the molecular weight of the polymer.

The coating can be applied to any suitable substrate that can be a sheet, a fiber, or a shaped article. However, the preferred substrates are those used for pressure-sensitive adhesive products. The composition can be applied to at least one major surface of suitable flexible or inflexible backing materials before curing is initiated. Useful flexible backing materials include, for example, paper, plastic films such as polypropylene, polyethylene, polyvinylchloride, polytetrafluoroethylene, polyvinylchloride, polyester, polyethylene terephthalate, cellulose acetate, ethyl cellulose, and the like.

Backings may also be constructions with irregular surfaces, such as woven fabric, nonwoven fabric, paper, or other materials having rough surfaces. Such woven fabrics can be formed from threads of synthetic or natural materials (e.g., cotton, nylon, rayon, glass, or ceramic material). Such nonwoven fabrics include air-laid webs of natural or synthetic fibers or blends of these, provided that the webs are not too porous so as to prevent substantial migration of the coating material into the backing material. Due to its high porosity, paper itself is usually not suitable unless heavier coatings of greater than one micrometer are applied in an effort to offset coating material soaking into the paper. However, glassine, plastic-coated, or impregnated paper is suitable. Other materials having rough surfaces include those having embossed or patterned surfaces and particle-impregnated resins, such as abrasive particle-covered resins (e.g., epoxy resins) and glass bead-covered resins. Many of these backings are commonly used in pavement marking tapes. In addition, suitable backings can be formed of metal, metallized polymeric film, natural or synthetic rubber, or ceramic sheet material. Primers can be used, but are not necessary.

The coating thickness will vary depending upon various factors such as, for example, the particular application, the coating formulation, and the nature of the substrate (e.g., its absorbency, porosity, surface roughness, crepe, chemical composition, etc.). Typically, a porous substrate or a rough surface will require a thicker coating than less porous substrates or smoother surfaces. Pressure-sensitive adhesive coatings typically will have a thickness between 25 $\mu$m and 250 $\mu$m.

Release coatings based on a cure-on-demand composition of the present invention will preferably have a thickness between 0.05 $\mu$m to 10 $\mu$m. Such release coatings can be coated on a substrate to make a release liner. When the release coating is applied to opposite sides of a substrate, differential release liners (i.e., those have different release properties on opposite sides) can be formed. For example, differential release liners can be formed by coating different chemical compositions on opposite sides of the substrate. Variations in coating methods can also be used to form differential release liners. For example, one side of a substrate can be continuously coated, with the opposite side being discontinuously coated.

Once the composition has been applied to a substrate, the acid generating material is activated by an energy source to release an acid catalyst that initiates and accelerates the cure. Thin films (e.g., films having a thickness of 2 mils or less) are preferred since they allow for easier moisture penetration and faster cure.

The invention will be more fully appreciated by referring to the following non-limiting examples.

EXAMPLES

Examples 1 to 6

Synthesis of Alkoxysilane and Acetoxysilane Functional Polysiloxanes

A precursor methylhydro-dimethylsiloxane polymer was prepared by combining, in a 4 liter plastic bottle, 500 grams octamethylcyclotetrasiloxane, 69.8 grams trimethylsilyl endcapped polymethylhydrosiloxane (degree of polymerization=40, commercially available from Hüls), 12.7 grams hexamethyl disiloxane, 0.5 gram concentrated sulfuric acid, and 2.5 grams activated carbon powder. The bottle was sealed and the mixture shaken for 3 days at room temperature. The mixture was then filtered and a clear, viscous liquid was obtained. Following filtration, unreacted low molecular weight impurities were removed by vacuum, resulting in a clear colorless viscous liquid.

In Example 1, a triethoxysilyl-functional polysiloxane was prepared by charging a three neck round bottom flask with 130 grams of the precursor methylhydro-dimethylsiloxane polymer, 100 ml dry heptane, 50 ppm of a 3% by weight solution of platinum divinyltetramethyldisiloxane catalyst in xylene, and 48 grams ω-alkenylsilane (vinyltriethoxysilane). The flask was purged with nitrogen and heated in an oil bath at 60° C. The reaction was followed using IR spectroscopy. When the IR spectrum showed no Si—H peak at 2150/cm (confirming the reaction of all —SiH groups on the methylhydro-dimethylsiloxane polymer), the solvent and any unreacted coreactant was removed at reduced pressure and the resulting liquid was kept under high vacuum pressure for six hours.

Examples 2–6 were similarly prepared using the types and amounts of ω-alkenylsilanes specified in Table 1.

TABLE 1

| Example | ω-Alkenylsilane[1] | Quantity (grams) |
|---|---|---|
| 1 | vinyltriethoxysilane | 48 |
| 2 | vinyltrimethoxysilane | 37 |
| 3 | Vinyldiethoxymethylsilane | 40 |
| 4 | Vinyldimethylethoxysilane | 32.5 |
| 5 | Vinyltriacetoxysilane | 58 |
| 6 | 3-butenyltriethoxysilane | 55 |

[1]all commercially available from Gelest Co.

Examples 7 to 22

Preparation of Moisture-Curable Compositions

Moisture-curable coatings were prepared by mixing, the reactive silane functional compounds from Examples 1 to 6, the reactive diluents listed in Table 2, and the acid generating materials listed in Table 3. The types and amounts of each of these components used in these moisture-curable compositions are listed in Table 4.

TABLE 2

| | Reactive Diluents |
|---|---|
| A | Dodecyltriethoxysilane |
| B | Ethyltriethoxysilane |
| C | Mercaptopropyltriethoxysilane |
| D | Tetraethoxysilane |
| E | Tridecafluorooctyltetrahydrotriethoxysilane |
| F | Bistriethoxysilylethane |
| G | Bistriethoxysilylhexane |
| H | 5-(bicycloheptenyl)triethoxysilane |

TABLE 3

| | Acid Generating Materials |
|---|---|
| AG 1 | 50% di(dodecylphenyl)iodonium hexafluorantimonate in methyltriethoxysilane |
| AG 2 | 20% di(dodecylphenyl)iodonium triflate in methyltriethoxysilane |
| AG 3* | 10% triarylsulfonium hexafluorantimonate in methyltriethoxysilane |
| AG 4 | 50% di(dodecylphenyl)iodonium hexafluorantimonate and 4% 2-isopropylthioxanthone in methyltriethoxysilane |
| AG 5 | 50% di(dodecylphenyl)iodonium hexafluorantimonate and 4% 2-isopropylthioxanthone in dodecyl alcohol |

*CYRACURE UVI-6974 (available from Union Carbide)

TABLE 4

| | Reactive Silane Functional Compound | | Acid Generating Material | | Reactive Diluent | |
|---|---|---|---|---|---|---|
| Example | Example | Wt. % | Type | Wt. % | Type | Wt. % |
| 7 | — | — | AG 1 | 15 | f | 85 |
| 8 | Ex. 1 | 48 | AG 4 | 4 | a | 48 |
| 9 | Ex. 1 | 48 | AG 4 | 4 | h | 48 |
| 10 | Ex. 2 | 48 | AG 1 | 4 | b | 48 |
| 11 | Ex. 3 | 48 | AG 4 | 4 | b | 48 |
| 12 | Ex. 4 | 48 | AG 4 | 4 | b | 48 |
| 13 | Ex. 5 | 48 | AG 1 | 4 | b | 48 |
| 14 | Ex. 6 | 48 | AG 1 | 4 | b | 48 |
| 15 | Ex. 6 | 50 | AG 4 | 1 | b | 50 |
| 16 | Ex. 1 | 48 | AG 4 | 4 | c | 48 |
| 17 | Ex. 1 | 15 | AG 4 | 2 | d | 80 |
| 18 | Ex. 1 | 79 | AG 4 | 1 | a | 20 |
| 19 | Ex. 1 | 48 | AG 2 | 4 | a | 48 |
| 20 | Ex. 1 | 48 | AG 3 | 4 | a | 48 |
| 21 | Ex. 1 | 48 | AG 4 | 4 | g | 48 |
| 22 | Ex. 1 | 48 | AG 5 | 4 | e | 48 |

The compositions of Examples 7 to 22 were coated onto a substrate and tested for adhesion to the substrate according to a modified version of Method B of American Society for Testing and Measurement (ASTM) Test Method D3359-87 ("Standard Test Method for Measuring Adhesion by Tape Test"). The compositions were coated onto a 50-micron thick primed polyester substrate at a coating thickness of 4–5 g/m² using a number 6 MAYER rod. The coated substrates were irradiated with 40 mJ/cm² ultraviolet radiation using a Fusion Systems Curing Unit equipped with FUSION-H bulbs, the bulbs having a power supply of 118 Watts/cm. Using a razor blade, 6 cuts of about 20 mm in length, spaced about 2 mm apart, were made in the cured coating, followed by similarly spaced cuts at 90° to and centered on the original cuts, so as to form a cross-cut grid of squares. An about 75 mm piece of a transparent pressure-sensitive adhesive tape (810 tape, commercially available from 3M Co.) was placed in firm contact with the cross-cut grid using 6 passes with a 2 kg roller. The tape was allowed to dwell for about 90 seconds on the sample. The tape was then peeled rapidly at an angle of about 180° from the sample. The cross-cut grid was then examined under magnification and evaluated using the following scale:

Excel Edges of the cuts were completely smooth; none of the squares detached.

Good Small flakes of the coating were detached at intersections. The area affected was up to 15% of the lattice.

Fair The coating was flaked along the edges and on parts of the squares. The area affected was 15% to 35% of the lattice.

Poor The coating was flaked along the edges of cuts in large ribbons and whole squares were detached. The area affected was 35% to 100% of the lattice.

The cured samples were also tested for solvent resistance and adhesion to the substrate by rubbing the coating surface with both ethyl acetate- and acetone-saturated cotton tipped applicators. As reported in Table 5, if the cured coatings withstood 30 or more passes (no visual evidence of degradation) with the applicators, then a rating of "Excel" was applied, while those lasting 10–29 passes and 1–9 passes were rated "Good" and "Fair," respectively.

TABLE 5

| Example | Adhesion to Substrate | Solvent Resistance |
|---|---|---|
| 7 | Excel | Fair |
| 8 | Excel | Good |
| 9 | Excel | Good |
| 10 | Excel | Excel |
| 11 | Excel | Good |

TABLE 5-continued

| Example | Adhesion to Substrate | Solvent Resistance |
|---|---|---|
| 12 | Excel | Good |
| 13 | Excel | Good |
| 14 | Excel | Good |
| 15 | Excel | Good |
| 16 | Excel | Good |
| 17 | Excel | Good |
| 18 | Good | Good |
| 19 | Excel | Good |
| 20 | Good | Good |
| 21 | Good | Good |
| 22 | Excel | Good |

These tests demonstrate that a variety of cured mixtures of alkoxysilane functional polysiloxanes, reactive diluents, and acid generating materials can be combined in varying ratios to yield coatings having, good to excellent substrate adhesion and solvent resistance.

Examples 23 to 31

Release and Readhesion Testing of Polysiloxane Release Coated Substrates

A release coating was prepared by mixing, 10 grams of the reactive silane functional compound of Example 1 and 10 grams triethoxymethylsilane reactive diluent to form a solution. To this solution, 0.3 gram of a 50% didodecylphenylidonium hexafluorantimonate in methyltriethoxysilane catalyst solution ("AG 1" as defined in Table 3) was added. This mixture was coated onto one of the following substrates using a number 6 MAYER rod at a coating thickness of 4–5 g/m$^2$;

TABLE 6

| Substrates | |
|---|---|
| BOPP | 25-micron thick biaxially oriented polypropylene |
| Paper | 50-micron thick Kraft paper |
| PC paper | 50-micron thick polyethylene coated paper |

The coated substrates were irradiated with 40 mJ/cm$^2$ ultraviolet radiation using a Fusion Systems Curing Unit equipped with Fusion-H bulbs, the bulbs having a power supply of 118 Watts/cm. The release-coated substrates were then tested for initial and aged release and aged readhesion using the following test methods:

Initial and Aged Release and Readhesion Test Methods

This test measures the effectiveness of the release composition initially and after a period of heat aging. The initial or aged release value is a quantitative measure of the force required to remove a flexible adhesive tape from a substrate coated with the test composition at a specific angle and rate of removal. In the following examples, this force is expressed in Newtons per decimeter (N/dm) from the following representative examples of flexible adhesive tapes:

Tape A—an aggressive acrylate copolymer pressure-sensitive adhesive on a 1.91 cm wide polypropylene backing;

Tape B—tackified styrene-isoprene block copolymer pressure-sensitive adhesive coated on a 1.91 cm wide polypropylene backing;

Tape C—tackified natural rubber coated on a 1.91 cm wide resin impregnated creped paper backing.

After allowing the cured coatings to condition at room temperature and 50% relative humidity for 24 hours, initial and aged release testing was conducted by laminating a 2.54 cm by 20.32 cm strip of the coated substrate prepared in the examples (coated side up) to the stage of an Instrumentors, Inc. slip/peel tester (model 3M90) with double coated tape. A 1.91 cm by 15.24 cm strip of a pressure-sensitive adhesive (PSA) coated test tape was rolled down onto the laminate thus formed with a 2 kg rubber roller. The force required to remove this tape at 180 degrees and a peel rate of 228.6 cm/minute after allowing the test tape to dwell in contact with the coated substrate initially (i.e., 30 minutes), for three days and, in some cases, three months at 25° C. was then measured.

Aged readhesions were also measured by adhering the freshly peeled tape to a clean glass plate and measuring the peel adhesion in normal fashion using the same Instrumentors slip/peel tester indicated above, again peeling at 228.6 cm/min and at a 180° peel angle after allowing the test tape to dwell for seven days at 25° C. These measurements were taken to determine whether a drop in the adhesion value occurred due to undesirable contamination of the adhesive surface by the release coating. Readhesions are reported as a percentage of the force required to remove the aged sample from a clean glass plate versus the force required to remove a control tape sample from a clean glass plate that has not been adhered to the release coating.

The results of these release and readhesion (Readh.) tests are found in Table 7.

TABLE 7

| Ex. | Substrate | Test Tape | Initial Release (N/dm) | Aged Release (7 days, 25° C.) (N/dm) | Aged Release (3 mos., 25° C.) (N/dm) | Initial Readh. (%) | Aged Readh. (7 days, 25° C.) (%) | Aged Readh. (3 mos, 25° C.) (%) |
|---|---|---|---|---|---|---|---|---|
| 23 | BOPP | A | 0.54 | 0.60 | — | 104 | 108 | — |
| 24 | BOPP | B | 0.25 | 0.49 | — | 84 | 97 | — |
| 25 | BOPP | C | 0.22 | 0.38 | — | 103 | 101 | — |
| 26 | Paper | A | 0.29 | 0.36 | 1.1 | 98 | 96 | 95 |
| 27 | Paper | B | 0.25 | 0.52 | 0.57 | 63 | 104 | 94 |
| 28 | Paper | C | 0.21 | 0.37 | 2.3 | 108 | 104 | 106 |
| 29 | PC paper | A | 0.40 | 0.31 | — | 99 | 97 | — |
| 30 | PC paper | B | 0.47 | 0.43 | — | 68 | 102 | — |
| 31 | PC paper | C | 0.18 | 0.55 | — | 102 | 107 | — |

These results demonstrate the effectiveness of these release coatings in delivering excellent performance and completeness of cure using a variety of substrates and common pressure-sensitive adhesives.

Examples 32 to 43

Release and Readhesion Testing of Polysiloxane Release Coated Substrates

A release coating was prepared by mixing 10 grams of the reactive silane functional compound of Example 1 and 10 grams of triethoxyoctylsilane reactive diluent to form a solution. To this solution, 0.4 gram of "AG 1" acid generating material (as defined previously) was added. This solution was then coated onto "Paper" or "PC paper" (as defined previously) or 50-micron thick polyethylene terephthalate film ("PET") substrates using a number 6 MAYER rod at the thicknesses given in Table 8. The coated substrates were irradiated with 40 mJ/cm$^2$ ultraviolet radiation using a Fusion Systems Curing Unit equipped with Fusion-H bulbs, the bulbs having an output of 118 Watts/cm. The release-coated substrates were then tested for initial and aged release and aged readhesion using the test methods of Examples 23 to 31. The results of these tests and the testing conditions are provided in Table 8.

TABLE 8

| | | Coating | | Release (N/dm) | | | |
|---|---|---|---|---|---|---|---|
| Ex. | Substrate | Weight (g/m$^2$) | Test Tape | Initial | 7 days, 25° C. | 7 days, 50° C. | 3 days, 70° C. |
| 32* | PC paper | 5 | A | 1.2 | 2.1 | 2.1 | 2.8 |
| 33* | PC paper | 5 | B | 0.69 | 1.1 | 2.3 | 2.8 |
| 34* | PC paper | 5 | C | 0.53 | 0.62 | 1.4 | 2.0 |
| 35 | PC paper | 5 | A | 1.9 | 2.3 | 2.6 | 3.0 |
| 36 | PC paper | 5 | B | 0.85 | 0.88 | 1.9 | 2.3 |
| 37 | PC paper | 5 | C | 0.98 | 1.5 | 2.3 | 2.3 |
| 38 | PET | 4 | A | 1.3 | 1.5 | 1.7 | 2.4 |
| 39 | PET | 4 | B | 0.68 | 0.80 | 1.6 | 2.0 |
| 40 | PET | 4 | C | 0.82 | 0.94 | 1.3 | 1.7 |
| 41 | paper | 5 | A | 1.5 | 1.7 | 1.9 | 3.2 |
| 42 | paper | 5 | B | 1.3 | 0.81 | 0.93 | 1.3 |
| 43 | paper | 5 | C | 1.2 | 1.6 | 3.0 | 3.9 |

*Cured coatings conditioned for 90 minutes at room temperature and 50% relative humidity rather than 24 hours.

These results illustrate the use of a cured mixture of the present invention as an effective release coating for a range of pressure-sensitive adhesives when coated on a variety of substrates.

Examples 44–46

Release and Readhesion Testing of Polysiloxane Release Coated Substrates

A release material was prepared by mixing 50 parts by weight of the reactive silane functional compound of Example 1 and 50 parts by weight of diethoxytetramethyldisiloxane reactive diluent to form a solution, and adding 3 parts by weight of "AG 1" acid generating material (as defined previously) to the solution. This solution was then coated onto 50-micron thick polyethylene terephthalate film (PET) substrates using a number 6 MAYER rod at a thickness or 5 g/m$^2$. The coated substrates were irradiated with 40 mJ/cm$^2$ ultraviolet radiation using a Fusion Systems Curing Unit equipped with Fusion-H bulbs, the bulbs having an output of 118 Watts/cm. The release-coated substrates were then tested for initial and aged release and aged readhesion using the test methods of Examples 23 to 31 for 7 days at 25° C., 3 days at 25° C., or 3 days at 70° C. The results of these tests are provided in Table 9.

TABLE 9

| Ex. | Substrate | Test Tape | Initial Release (N/dm) | Aged Release (3 days, 25° C.) (N/dm) | Aged Release (3 days, 70° C.) (N/dm) | Initial Readh. (%) | Aged Readh. (3 days, 25° C.) (%) | Aged Readh. (3 days, 70° C.) (%) |
|---|---|---|---|---|---|---|---|---|
| 44 | PET | A | 0.19 | 0.95 | 0.81 | 98 | 95 | 104 |
| 45 | PET | B | 0.13 | 0.10 | 0.11 | 101 | 104 | 95 |
| 46 | PET | C | 0.07 | 0.07 | 0.22 | 85 | 107 | 110 |

Examples 47–49

Release And Readhesion Testing of Polysiloxane Release Coated Substrates

A bis-triethoxysilyl terminated polydimethylsiloxane precursor was prepared by mixing 77 grams of a vinyl terminated polydimethylsiloxane (Mw=700, commercially available from Gelest Co.), 40 grams triethoxysilane, 250 ml heptane, and 50 ppm Pt catalyst (3% platinum-divinyltetramethyl siloxane complex in xylene, commercially available form Hüls) in a nitrogen-purged, 3-necked, 1 liter flask. The mixture was heated to 70° C. and stirred for 16 hours. The excess silane and solvent were then removed by vacuum, yielding 110 grams of colorless, clear product.

A release coating was prepared by mixing 50 parts by weight bis-triethoxysilyl terminated polydimethylsiloxane and 50 parts by weight hydroxy-terminated polydimethylsiloxane having Mw=610 to form a solution. To this solution, 3 parts by weight of "AG 1" acid generating material (as defined previously) was added. This solution was then coated onto 50-micron thick polyethylene terephthalate film (PET) substrates using a number 6 MAYER rod at a thickness or 5 g/m$^2$. The coated substrate was irradiated with 40 mJ/cm$^2$ ultraviolet radiation using a Fusion Systems Curing Unit equipped with Fusion-H bulbs, the bulbs having an output of 118 Watts/inch. The release-coated substrates were then tested for initial and aged release and aged readhesion using the test methods of Examples 23 to 31 for 7 days at 25° C., 3 days at 25° C., or 3 days at 70° C. The results of these tests are provided in Table 10.

TABLE 10

| Ex. | Substrate | Test Tape | Initial Release (N/dm) | Aged Release (3 days, 25° C.) (N/dm) | Aged Release (3 days, 70° C.) (N/dm) | Initial Readh. (%) | Aged Readh. (3 days, 25° C.) (%) | Aged Readh. (3 days, 70° C.) (%) |
|---|---|---|---|---|---|---|---|---|
| 47 | PET | A | 0.15 | 2.66 | 3.13 | 96 | 103 | 99 |
| 48 | PET | B | 0.35 | 0.66 | 0.62 | 80 | 92 | 96 |
| 49 | PET | C | 0.12 | 0.46 | 0.93 | 97 | 94 | 93 |

Example 50

Release and Readhesion Testing of Polysiloxane Release Coated Substrates

A polydimethylsiloxane precursor having triethoxysilyl thioether endgroups was prepared by mixing 200 grams of a vinyl terminated polydimethylsiloxane (Mw=4200, commercially available from Gelest Co.), 19.6 grams mercaptopropyl triethoxysilane, 156 ml ethyl acetate, and 2 grams VAZO 64 (azo-bis(isobutyronitrile) initiator commercially available from DuPont Co.) in a nitrogen-purged, 3-necked, 1 liter flask. The mixture was heated to 60° C. and stirred for 22 hours. The excess silane and solvent were then removed by vacuum, yielding 219 grams of colorless, viscous product.

A release coating was prepared by mixing 90 parts of this bis-triethoxysilyl terminated polydimethylsiloxane product and 10 parts bis(trimethoxysilyl)hexane diluent form a solution. To this solution, 3 parts by weight of "AG 1" acid generating material (as defined previously) was added. This solution was then coated onto 50-micron thick polyethylene terephthalate film (PET) substrates using a number 6 MAYER rod at a thickness or 5 g/m². The coated substrate was irradiated with 40 mJ/cm² ultraviolet radiation using a Fusion Systems Curing Unit equipped with Fusion-H bulbs, the bulbs having an output of 118 Watts/cm. The release-coated substrates were then tested for initial and aged release and aged readhesion using the test methods of Examples 23–31 for 7 days at 25° C., 3 days at 25° C., or 3 days at 70° C. The results of these tests are provided in Table 11.

TABLE 11

| Ex. | Sub-strate | Test Tape | Initial Release (N/dm) | Aged Release (3 days, 25° C.) (N/dm) | Aged Release (3 days, 70° C.) (N/dm) | Initial Readh. (%) | Aged Readh. (3 days, 25° C.) (%) | Aged Readh. (3 days, 70° C.) (%) |
|---|---|---|---|---|---|---|---|---|
| 50 | PET | A | 0.85 | 0.69 | 2.78 | 37 | 72 | 66 |

Examples 51 and 52

Preparation and Release Testing of Fluorinated Polyether Release Coatings

A fluorinated polyether release coating was prepared according to the method of U.S. Pat. No. 5,306,758 (Pellerite) except that the conventional catalysts employed were replaced with the acid generating materials of the present invention. The fluorinated polyether was prepared by mixing 1 gram of the polyfluoropolyether bis(triethoxysilane) of the following formula

$(CH_3CH_2O)_3—Si(CH_2)_3—NHC(O)CF_2O(CF_2O)_m(CF_2CF_2O)_n—CF_2C(O)NH(CH_2)_3Si—(OCH_2CH_3)_3$ wherein m is about 13 and n is about 15 and 0.35 gram KRYTOX 1514 (a polyfluoropolyether fluid commercially available from DuPont Co.) in 3 grams ethyl perfluorobutyl ether solvent. To this solution, 0.03 gram of "AG 1" acid generating material was added. This solution was then coated onto a 50-micron thick polyethylene terephthalate film (PET) substrate using a number 6 MAYER rod at a thickness of <1 g/m². The coated substrates were irradiated with 40 mJ/cm² ultraviolet radiation using a Fusion Systems Curing Unit equipped with Fusion-H bulbs, the bulbs having an output of 118 Watts/cm. The release-coated substrates were then tested for aged release and aged readhesion against two silicone pressure-sensitive adhesives (Example 51—DC-280A, a polydimethyl siloxane gum and resin dispersion diluted with xylene to 55 percent by weight silicone solids content, commercially available from Dow Corning; and Example 52—GE-595, a polydimethyl siloxane gum and resin dispersion diluted with xylene to 55 percent by weight silicone solids content, commercially available from General Electric Co.) using the following wet-cast adhesive release test method:

A 50% by weight solution of the silicone adhesive mixed with 2% by weight benzoyl peroxide initiator was knife coated onto the cured fluoropolymeric release coating at a wet film thickness of 250 microns. The coating was dried at 70° C. for 1 minute, then cured for 2 minutes at 170° C. The exposed surface of the layer of adhesive was then laminated to a polyester film having a thickness of 50 microns. Strips having a width of 2.5 cm were cut from this laminate and the release was measured at a peel rate of 2.3 meters/min after three days at 25° C. and 70° C. by the test methods of Examples 23 to 31. Readhesions were also measured after dwell times of three days at 25° C. and 70° C. as described above. The results of these tests are provided in Table 12.

TABLE 12

| Ex. | Adhesive | Aged Release (3 days, 25° C.) (N/dm) | Aged Release (3 days, 70° C.) (N/dm) | Aged Readh. (3 days, 25° C.) (%) | Aged Readh. (3 days, 70° C.) (%) |
|---|---|---|---|---|---|
| 51 | DC280A | 0.29 | 0.18 | 81.4 | 99.5 |
| 52 | GE-595 | 0.69 | 0.79 | 80.2 | 108 |

Examples 53 to 56

Preparation and Release Testing of Fluorinated Polyether Release Coatings

A fluorinated polyether release coating was prepared, coated, cured according to the methods of Examples 51–52, except that no KRYTOX 1514 polyfluoropolyether fluid was used. The release-coated substrates were then tested for initial and aged release and readhesion using the test methods of Examples 23 to 31 initially, for 3 days at 25° C., and 3 days at 70° C. The results of these tests are provided in Table 13.

TABLE 13

| Ex. | Sub-strate | Test Tape | Initial Release (N/dm) | Aged Release (3 days, 25° C.) (N/dm) | Aged Release (3 days, 30° C.) (N/dm) | Initial Readh. (%) | Aged Readh. (3 days, 25° C.) (%) | Aged Readh. (3 days, 70° C.) (%) |
|---|---|---|---|---|---|---|---|---|
| 53 | PET | A | 0.19 | 6.91 | 9.65 | 127 | 111 | 118 |
| 54 | PET | B | 0.27 | 1.27 | 1.43 | 96 | 94 | 97 |
| 55 | PET | C | 0.04 | 0.85 | 1.27 | 99 | 103 | 102 |

The release coating was also tested using the following variation on the wet cast adhesive release test method of Examples 51–52:

A heptane-methyl ethyl ketone solution of a pressure-sensitive adhesive composition comprising isooctyl acrylate (95.5 wt %)-acrylic acid (4.5 wt %) copolymer, as described in Example 5 of U.S. Pat. No. Re. 24,906 was knife coated onto the cured fluoroether release coating. The coating was dried at 70° C. for 15 minutes. The exposed surface of the layer of adhesive was then laminated to a polyester film having a thickness of 50 microns. Strips having a width of 2.5 cm were cut from this laminate and the release was measured at a peel rate of 2.3 meters/min after three days at 25° C. and 70° C. by the test methods of Examples 23–31. Readhesions were also measured after dwell times of three days at 25° C. and 70° C. as described above. The results of these tests are provided in Table 14.

TABLE 14

| Ex. | Substrate | Initial Release (N/dm) | Aged Release (3 days, 25° C.) (N/dm) | Aged Release (3 days, 30° C.) (N/dm) | Initial Readh. (%) | Aged Readh. (3 days, 25° C.) (%) | Aged Readh. (3 days, 70° C.) (%) |
|---|---|---|---|---|---|---|---|
| 56 | PET | 6.10 | 7.68 | 9.25 | 107 | 121 | 119 |

Examples 57 and 58

Preparation and Release Testing of Higher Alkyl Release Coatings

A higher alkylene release coating w as prepared by mixing 1 gram octadecyltriethoxysilane, 0.2 gram bistriethoxysilylhexane, and 0.05 gram "AG 1" acid generating material. This solution was then coated onto 50-micron t hick PET film substrates using a number 6 MAYER rod at a thickness or 5 g/m$^2$. The coated substrate was irradiated with 40 mJ/cm$^2$ ultraviolet radiation using a Fusion Systems Curing Unit equipped with Fusion-H bulbs, the bulbs having an output of 118 Watts/cm. The release-coated substrates were then tested for aged release and aged readhesion using the test methods of Examples 23 to 31 for 1 day at 25° C. and 14 days at 25° C. The results of these tests are provided in Table 15.

TABLE 15

| Ex. | Adhesive | Aged Release (1 day, 25° C.) (N/dm) | Aged Release (14 days, 25° C.) (N/dm) | Aged Readh. (1 day, 25° C.) (%) | Aged Readh. (14 days, 25° C.) (%) |
|---|---|---|---|---|---|
| 57 | A | 0.42 | 0.38 | 94 | 89 |
| 58 | B | 1.35 | 1.47 | 83 | 91 |

Examples 59 to 65

Synthesis of Reactive Silane Functional Fluoroacrylate Copolymers

Examples 59 to 65 illustrate the preparation of reactive silane functional fluoroacrylate copolymers. To prepare the copolymers, a 118 ml bottle was charged with 100 mg VAZO 64 (2,2'-azobis(isobutyronitrile) initiator commercially from duPont), 40 grams ethylacetate and the fluoroalkyl-substituted(meth)acrylate comonomers and silane-functional reactive monomers indicated in Table 16. The mixtures were purged with nitrogen at a rate of 1 liter per minute for 35 seconds, sealed, and heated in a rotating water bath at 60° C. for 20 hours.

TABLE 16

| Starting Compound(s) | Ex. 59 (g) | Ex. 60 (g) | Ex. 61 (g) | Ex. 62 (g) | Ex. 63 (g) | Ex. 64 (g) | Ex. 65 (g) |
|---|---|---|---|---|---|---|---|
| FX-14[1] | 12 | — | 7.5 | — | — | 6 | — |
| Zonyl T-AN[2] | — | 12 | — | 7.5 | — | 6 | 3.75 |
| A-174[3] | 3 | 3 | 7.5 | 7.5 | 3 | 3 | 7.5 |
| N-methyl FOSEA[4] | — | — | — | — | 12 | — | 3.75 |

TABLE 16-continued

| Starting Compound(s) | Ex. 59 (g) | Ex. 60 (g) | Ex. 61 (g) | Ex. 62 (g) | Ex. 63 (g) | Ex. 64 (g) | Ex. 65 (g) |
|---|---|---|---|---|---|---|---|
| Mercaptopropyl Trimethoxymethyl Silane[5] | 0.3 | 0.3 | 0.3 | 0.3 | 0.3 | 0.3 | 0.3 |

[1] N-ethylperfluorooctanesulfonamido-ethyl methacrylate, commercially available from 3M Co.
[2] ω perfluoro-$C_{8-10}$-ethyl acrylates, commercially available from duPont Co.
[3] 3-(trimethoxysilyl)propylmethacrylate, commercially from OSI Specialties.
[4] N-methylperfluorooctanesulfonamido-ethyl acrylate, commercially available from 3M Co.
[5] commercially available from OSI Specialties.

Examples 66 to 72

Preparation and Testing of Fluorochemical Protective Coatings

Protective coatings were prepared by mixing solutions containing 2.9 grams of the reactive silane functional copolymers of Examples 59–65 and 0.03 gram "AG 1" acid generating, material. The solutions were coated onto 50-micron thick primed PET film using, a Number 12 MAYER rod at a thickness of about 8 µm. The coated films were irradiated with 100 mJ/cm$^2$ ultraviolet radiation using, a Fusion Systems Curing, Unit equipped with Fusion-H bulbs, the bulbs having, an output of 118 Watts/cm. The cured films were nontacky to the touch. When marked using permanent laundry markers such as SHARPIE permanent marker pens, the marks beaded up and were readily removed by wiping. Such beading indicates good oil resistance in these cured films.

Examples 73 to 79

Preparation and Testing of Fluorochemical Protective Coatings

Reactive diluent containing solutions containing 1.0 grams of the reactive silane functional copolymers of Examples 59–65, 1.0 gram methyltriethoxysilane reactive diluent and 0.024 gram "AG 1" acid generating material were prepared, coated, cured and tested according to the methods of Examples 66 to 72. These films were also non-tacky and oil-repellent, but less oil repellent than the coatings of Examples 66 to 72, possibly due to the lower fluorochemical content.

Example 80

Preparation and Testing of Poly(α-Olefin) Copolymer Pressure-Sensitive Adhesive A 1-hexene-co-1,7-octadiene copolymer having a 97:3 mole ratio was prepared according to the method of Example 1 of U.S. Pat. No. 5,397,648 (Babu et al.). 60 grams of this copolymer was dissolved in 600 grams toluene and this solution was refluxed under nitrogen. To this solution, 5 grams triethoxysilane and 50 ppm Pt catalyst were added and the reaction run at 60° C. for 16 hours. The excess unreacted reagents and solvent were then removed by vacuum. 2 grams of the product was redissolved in toluene and 0.06 gram of a 50% didodecyliodonium hexafluorantimonate in methyltriethoxysilane catalyst solution (AG-1 as defined in Table 4) was added. The solution was knife coated onto a primed polyester substrate and dried for 15 minutes at 70° C. to a dried coating thickness of 50 μm. The coated substrates were irradiated with 80 mJ/cm² ultraviolet radiation using a Fusion Systems Curing Unit equipped with Fusion-H bulbs, the bulbs having a power supply of 118 Watts/cm. The peel adhesion (the force required to remove a coated flexible sheet material from a test panel measured at a specific angle and rate of removal) was 12.0 N/dm as measured by the following peel adhesion test method:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180 degree(s). The free end is attached to the adhesion tester scale.
3. The glass test plate is clamped in the jaws of the tensile testing machine that is capable of moving the plate away from the scale at a constant rate of 2.3 meters per minute.
4. The scale reading in Newtons/decimeter is recorded as the tape is peeled from the glass surface. The data is recorded as the average value of the range of numbers observed during the test.

Example 81

Preparation and Testing Polysiloxane Pressure-Sensitive Adhesive

A low molecular weight polydimethylsiloxane diamine precursor was prepared by mixing 4.32 parts bis(3-aminopropyl)tetramethyl disiloxane and 95.68 parts octamethylcyclotetrasiloxane in a batch reactor that was purged with nitrogen for 20 minutes. The mixture was then heated in the reactor to 150° C. 100 ppm of 50% aqueous cesium hydroxide was added to the mixture and heating continued for 6 hours until the disiloxane was consumed. The reaction mixture was then cooled to 90° C., neutralized with excess acetic acid in the presence of triethylamine, and heated under high vacuum to remove residual cyclic siloxanes for over 5 hours. The material was cooled to room temperature, filtered to remove any cesium acetate that had formed, and titrated with 1.0N hydrochloric acid to determine the number average molecular weight (Mw) of the purified product (Mw of approximately 5,000).

A high molecular weight polydimethylsiloxane diamine precursor having a molecular weight (Mw) of 61,000 was prepared by a similar method by combining 8.7 parts of the low molecular weight precursor with 91.3 parts octamethyltetrasiloxane.

59.63 grams of this high molecular weight polydimethylsiloxane diamine, 0.50 gram isocyanatopropyl triethoxysilane (available from Silar Labs), and 99.0 grams of MQ Resin 545 (a 60% solids toluene solution of MQ silicate tackifying resin commercially available from GE. Co.) were mixed and magnetically stirred in a 250 ml round bottom flask. To this mixture, 8 grams "AG 1" was added. This viscous liquid was coated at a dry thickness of 50 microns on primed polyester film using a knife coater. The coated films were irradiated with 40 mJ/cm² ultraviolet radiation using a Fusion Systems Curing Unit equipped with Fusion-H bulbs, the bulbs having an output of 118 Watts/cm. A tacky PSA coating was obtained quickly after UV exposure. The peel adhesion of this silicone pressure-sensitive adhesive was 61.3 N/dm as measured by the peel adhesion test method described in conjunction with Example 80.

Example 82

Preparation of Polyether Pressure-Sensitive Adhesives

A mixture of 10 grams silane endcapped polypropylene oxide (SAT-30 from Kaneka) and 0.2 gram AG-1 was prepared. This viscous liquid was coated at a thickness of 50 microns on primed polyester film using a knife coater. The coated films were irradiated with 40 mJ/cm² ultraviolet radiation using a Fusion Systems Curing Unit equipped with Fusion-H bulbs, the bulbs having an output of 118 Watts/cm. A tacky PSA coating was obtained quickly after UV exposure. The peel adhesion of this polyether pressure-sensitive adhesive was 16.4 N/dm as measured by the peel adhesion test method described in conjunction with Example 80.

Examples 83–85

Synthesis, Curing and Release Testing of Alkoxysilane Functional Fluorosilicones A precursor methylhydro-dimethylsiloxane polymer having 34 mole % methyl hydro groups and a molecular weight=6924 was prepared by combining, in a 4 liter plastic bottle, 500 grams octamethylcyclotetrasiloxane, 241 grams trimethylsilyl end capped polymethylhydrosiloxane (degree of polymerization=40, commercially available from Hüls), 17.1 grams hexamethyl disiloxane, 0.5 gram concentrated sulfuric acid, and 2.5 grams activated carbon powder. The bottle was sealed and the mixture shaken for 30 days at room temperature. The mixture was then filtered and a clear, viscous liquid was obtained. Following filtration, unreacted low molecular weight impurities were removed by vacuum, resulting in a clear colorless viscous liquid.

A dimethylethoxysilyl-functional fluorosilicone was prepared by charging a 500 ml three neck round bottom flask with 30 grams of the precursor methylhydrodimethylsiloxane polymer, 42 grams tridecafluoroctene, 3.4 grams vinyldimethylethoxysilane, and 250 ml dry heptane. The flask was purged with nitrogen and heated in an oil bath at 60° C. 50 ppm of a 3% by weight solution of platinum divinyltetramethyldisiloxane catalyst in xylene was then added to the flask. The reaction was followed using IR spectroscopy. When the IR spectrum showed no Si—H peak at 2150/cm (confirming the reaction of all —SiH groups on the methylhydro-dimethylsiloxane polymer), the solvent and any unreacted coreactant was removed at reduced pressure and the resulting liquid was kept under high vacuum pressure for six hours.

Moisture-curable fluorosilicone release coating formulations were prepared by mixing the dimethylethoxysilyl-functional fluorosilicone polymer, reactive diluents, and AG-1 (as defined previously) as described in Table 17. These solutions (10% by weight in heptane) were then coated onto a 50-micron thick polyester film ("PET") substrate using a number 6 MAYER rod to a dried thickness of 1 μm. The coated substrates were irradiated with 25 mJ/cm² ultraviolet radiation using a Fusion Systems Curing Unit equipped with Fusion-H bulbs, the bulbs having an output of 118 Watts/cm. The release-coated substrates were then tested for initial and aged release against SCOTCH 8403, a pressure-sensitive adhesive tape commercially available from 3M Co., using the test methods of Examples 23–31. The results of these tests and the testing conditions are provided in Table 17.

TABLE 17

| Ex. | Fluorosilicone (parts by weight) | Reactive Diluent (parts by weight) | AG-1 (parts by weight) | Initial Release (N/dm) | Aged Release (3 days, 25° C.) (N/dm) | Aged Release (3 days, 70° C.) (N/dm) |
|---|---|---|---|---|---|---|
| 83 | 100 | — | 3 | 1.2 | 6.3 | 26 |
| 84 | 100 | 50[1] | 3 | 0.73 | 3.4 | 6.0 |
| 85 | 100 | 50[2] | 3 | 1.3 | 10.6 | 12.3 |

[1]tetramethyl diethoxydisilane reactive diluent
[2]trifluoropropyl methyldimethoxysilane reactive diluent

Examples 86–88

Preparation and Release Testing of Fluorinated Polyether Release Coatings

A fluorinated polyether release coating was prepared, coated, cured according to the methods of Examples 51–52, except that no KRYTOX 1514 polyfluoropolyether fluid and the polyfluoropolyether bis(methyldiethoxysilane) of the following formula were used

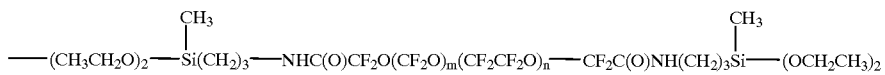

wherein m is about 13 and n is about 15.

The release-coated substrates were then wet cast with acrylic pressure-sensitive adhesive from solutions as described in Example 56 and tested for initial and aged release and readhesion using the test methods of Examples 23–31 initially, for 3 days at 25° C., and 3 days at 70° C. A heptane-methyl ethyl ketone solution of a pressure-sensitive adhesive composition comprising isooctyl acrylate (95.5 wt %)-acrylic acid (4.5 wt %) copolymer, as described in Example 5 of U.S. Pat. No. Re. 24,906, was used in Example 86, while a 90 wt.%/10 wt.% 90/10 isooctyl acrylate/acrylic acid pressure-sensitive adhesive solution prepared by the same method was used in Example 87. The results of these tests are provided in Table 18.

In Example 88, a radiation curable acrylate pressure-sensitive adhesive formulation was wet cast on the cured fluorinated polyether release coating. The radiation curable acrylate pressure-sensitive adhesive was prepared by the following method:

A mixture of 90 parts isooctyl acrylate, 10 parts acrylic acid, and 0.04 part IRGACURE 651 (2,2-dimethoxy-2-phenyl acetophenone photoinitiator available from Ciba-Geigy Corp.) was inerted under nitrogen atmosphere and partially photopolymerized under UV radiation to yield a coatable syrup having a viscosity of about 3,000 cPs. After mixing an additional 0.1 part IRGACURE 651 and 0.08 part 2,4-bis(trichloromethyl)-6-p-methoxystyrene-s-triazine to the syrup, the syrup was coated at a thickness of 50 μm onto the cured fluorinated polyether release coated sample and the exposed surface of the syrup was covered with a polyester film. This laminate structure was then irradiated with a 400 mJ/cm$^2$ dosage of ultraviolet radiation using a Fusion Systems Curing Unit equipped with Fusion-H bulbs, the bulbs having an output of 118 Watts/cm and tested for initial and aged release and readhesion using the test methods of Examples 23–31. The results of these tests can be found in Table 18. The results of the initial and aged release and readhesion testing of Example 88 can be found in Table 18.

TABLE 18

| Ex. | Substrate | Initial Release (N/dm) | Aged Release (3 days, 25° C.) (N/dm) | Aged Release (3 days, 30° C.) (N/dm) | Initial Readh. (%) | Aged Readh. (3 days, 25° C.) (%) | Aged Readh. (3 days, 70° C.) (%) |
|---|---|---|---|---|---|---|---|
| 86 | PET | 2.0 | 2.1 | 1.6 | 101 | 100 | 95 |
| 87 | PET | 0.28 | 0.31 | 0.77 | 143 | 93 | 95 |
| 88 | PET | 0.77 | 0.53 | 1.02 | — | 70 | 128 |

Examples 89–90

Preparation and Testing of Moisture Curable Acrylate Pressure-Sensitive Adhesives Examples 89 and 90 illustrate the preparation of reactive silane functional acrylate copolymers that can be used, when cured, as pressure-sensitive adhesive materials. To prepare the copolymers, a 118 ml bottle was charged with 48 mg VAZO 64 (2,2'-azobis(isobutyronitrile) initiator commercially from DuPont), 36 grams ethylacetate and the isooctyl acrylate ("IOA") and trimethoxypropyl methacrylate (A174) silane reactive monomers. A 1% solution of A174 in IOA was prepared by mixing 0.5 g A174 and 49.5 g of IOA. In example 89, 23.88 g IOA and 0.12 g A174 in IOA were combined with the initiator and solvent, while 12.0 g IOA and 12.0 g 1% A174 in IOA were combined in example 90. The mixtures were purged with nitrogen at a pressure of 1 atmosphere for 35 seconds, sealed, and heated in a rotating water bath at 55° C. for 20 hours. This viscous liquid was coated to a dry thickness of 50 μm on primed polyester film using a knife coater. The coated films were irradiated with 80 mJ/cm$^2$ ultraviolet radiation using a Fusion Systems Curing Unit equipped with Fusion-H bulbs, the bulbs having an output of 118 Watts/cm. A tacky PSA coating was obtained quickly after UV exposure. The peel adhesion of these acrylate pressure-sensitive adhesives were 43.9 N/dm (Example 89) and 9.9 N/dm (Example 90) as measured by the peel adhesion test method described above.

Examples 91–93

Preparation and Release Testing of Electrosprayed Polysiloxane Release Coatings

A bis(dodecylphenyl)iodonium tetrakis (pentafluorophenyl)borate electroconductivity enhancing acid generating salt was prepared according to the method of U.S. Pat. No 5,340,898 (Cavezzan et al.). Using this method, a lithium tetrakis(pentafluorophenyl)borate salt was first formed by the lithiation of bromopentafluorobenzene with n-butyl lithium, followed by the reaction of this lithiated intermediate with boron trichloride. In a separate reaction, dodecylbenzene was treated with potassium iodate and sulfuric acid to form an iodonium bisulfate —[($C_{12}H_{25}$($C_6H_5$))$_2$I]$^+$[HSO$_4$]$^-$. The iodonium bisulfate was combined with the lithium borate salt to provide a 90 wt. % yield of the electroconductivity enhancing acid generating salt as a viscous red oil.

A mixture was prepared by first dissolving 1.6 grams of the above-prepared acid generating salt in 4.8 grams of triethoxymethyl silane (M9050-KG, commercially available from United Chemical Technologies Co.). This solution was then mixed with 100.0 grams linear polydimethylsiloxydisilanol having a degree of polymerization equal to 8 (DMS-S12, commercially available form Gelest Inc.) and 100.0 grams bistriethoxysilyloctane reactive diluent (SIB 1824.0, commercially available from Gelest Inc.).

The mixture was electrosprayed onto an unprimed polyester film having a thickness of 36 micrometers moving at the speed of 15.24 meters/minute (50 feet/minute) using the following coating process:

About 0.3 liter of the mixture was placed in a small glass jar and drawn out by a pump (MASTERFLEX pump drive Model 7520-25, MICROPUMP Model 07002-26 pump head, both available from Cole-Palmer Instrument Co., Chicago, Ill.) to the sprayhead. The sprayhead consisted of two plastic die halves, which when placed together, maintained a 0.508 millimeter exit slot along the bottom of the die. Recessed in the slot and compressed to 1.53 millimeters was a POREX Model X-4920 porous plastic sheet (commercially available from Porex Technologies; Fairburn, Ga.) to maintain a pressure drop that allowed uniform flow from the sprayhead to a wire. The wire (having a diameter of 1.59 millimeters) was suspended in a horizontal plane parallel to a slot head and two extractor rods (each having a diameter of 6.35 millimeters). The extractor rods were positioned symmetrically in the horizontal direction with respect to the wire. The horizontal plane in which the wire was positioned was located 0.889 millimeter below the slot head and 11.1 millimeters below the plane of the extractor rods. The extractor rods were positioned 0.12 meter above an earth-grounded metal coating drum having a diameter of 0.508 meter and a width of 0.61 meter. The slot head had a width of 0.318 meter (0.33 meter, including the die end caps). The 0.33 meter width was used to calculate the flow rate required to obtain a desired coating height at any defined web speed.

The moving, unprimed polyester film was charged on the coating drum using a corotron (a half-moon-shaped, earth-grounded conductor made from a 72 millimeter inner diameter aluminum pipe and a 60 micrometer diameter wire attached to a positive power supply having model no. PS/WG-10P30-DM, available from Glassman High Voltage, Inc.; Whitehouse Station, N.J.). The corotron voltage was adjusted to maintain the polyester film at a 1,000 volt potential relative to the grounded coating drum.

A negative, 30 kilovolt GLASSMAN power supply having model no. PS/WG-5ON6-DM (commercially available from Glassman High Voltage, Inc.) was connected to the sprayhead wire. The extractor electrodes were held at ground potential.

When a coating flow was present, liquid filaments formed over the wetted 0.33 meter length of the wire. The filaments scattered, creating a mist of negatively charged droplets that were attracted to the positively charged polyester film. A one-micrometer-thick coating was formed on the polyester film.

The coating was irradiated with 63 mJ/cm² ultraviolet radiation using a Fusion Systems Curing Unit equipped with Fusion-H bulbs, the bulbs having an output of 118 Watts/cm. The cured, coated films were then tested for aged release and readhesion using the test methods described in Examples 22–31. Certain samples were aged for 3 days at 25° C. Other samples were aged at 70° C. for 3 days.

TABLE 19

| Ex | Substrate | Test Tape | Aged Release (3 days, 25° C.) (N/dm) | Aged Release (3 days, 70° C.) (N/dm) | Aged Readh. (3 days, 25° C.) (%) | Aged Readh. (3 days, 70° C.) (%) |
| --- | --- | --- | --- | --- | --- | --- |
| 91 | PET | B | 1.9 | 2.1 | 102.3 | 103.5 |
| 92 | PET | C | 3.8 | 4.2 | 100.0 | 102.1 |
| 93 | PET | D* | 2.0 | 2.0 | 121.7 | 119.8 |

*acrylic adhesive tape (Tape No. 810, commercially available from Minnesota Mining and Manufacturing Co.; St. Paul, MN)

Various modifications and alterations of the invention will become apparent to those skilled in the art without departing from the spirit and scope of the invention, which is defined by the accompanying claims.

What is claimed is:

1. A cure-on-demand, moisture-curable composition comprising:
   (a) a compound comprising molecules bearing reactive silane functional groups having the structure:

wherein:
      moiety A is an m-valent radical selected from fluoroalkyl radicals, fluoroaryl radicals, and polymeric radicals comprising a polymer selected from polysiloxane, polyolefin, polyester, polyphosphazene, fluorosilicone, fluorinated polyacrylate, fluorinated polyether, fluorinated polyester, and derivatives and combinations thereof;
      p is an integer from 1 to 3;
      m is an integer greater than or equal to 1;
      each $R^1$ is individually selected from alkyl radicals and acyl radicals;
      each $R^2$ is individually selected from hydrogen, alkyl radicals, acyl radicals and aryl radicals; and
      G is an optional linking moiety which, when present, links radical A to the reactive silane functional groups; and
   (b) an acid generating material that is free of ammonium salt and that liberates an acid that is capable of curing the moisture-curable composition;
wherein the reactive silane functional groups are the only acid curable groups present in the composition and wherein average reactive silane functionality of the moisture-curable composition is greater than two.

2. A cure-on-demand, moisture-curable composition according to claim 1, further comprising a reactive diluent.

3. A cure-on-demand, moisture-curable composition according to claim 1, wherein the composition is curable to provide a low surface energy material.

4. A cure-on-demand, moisture-curable composition according to claim 1, wherein the composition is curable to provide a release coating.

5. A cure-on-demand, moisture-curable composition according to claim 1, wherein the polymeric radical is of linear, branched, block or graft construction.

6. A cure-on-demand, moisture-curable composition according to claim 1, wherein A is selected from fluorosilicone, fluorinated polyacrylate, fluorinated polyether, or fluorinated polyester.

7. A cure-on-demand, moisture-curable composition according to claim 1, wherein each $R^1$ is individually selected from the group consisting of alkyl radicals having 1 to 4 carbon atoms.

8. A cure-on-demand, moisture-curable composition according to claim 1, wherein each $R^2$ is individually selected from the group consisting of alkyl radicals having 1 to 4 carbon atoms.

9. A cure-on-demand, moisture-curable composition according to claim 1, wherein m is an integer from 1 to 50.

10. A cure-on-demand, moisture-curable composition according to claim 1, wherein G is present and is selected from oxygen, alkylene radicals, arylene radicals and

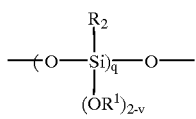

wherein:
each $R^1$ is individually selected from alkyl radicals and acyl radicals;
each $R^2$ is individually selected from hydrogen, alkyl radicals, acyl radicals and aryl radicals;
q is an integer from 1 to 40; and
v is 0 or 1.

11. A cure-on-demand, moisture-curable composition according to claim 1, wherein:
G is —$CH_2CH_2$—;
m is 6;
p is 1 or 2;
$R^1$ is —$CH_2CH_3$;
$R^2$ is —$CH_3$; and
A is:

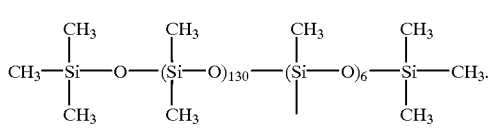

12. A cure-on-demand, moisture-curable composition according to claim 1, wherein:
G is —$CH_2CH_2$—;
m is 6;
p is 3;
$R^1$ is —$CH_2CH_3$; and
A is:

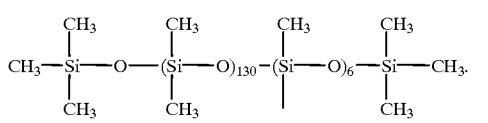

13. A cure-on-demand, moisture-curable composition according to claim 1, wherein said acid generating material is capable of generating acid upon exposure to ultraviolet light, visible light, or electron beam irradiation.

14. A cure-on-demand, moisture-curable composition according to claim 1, wherein said acid generating material liberates an acid that has a pKa of less than about 3.

15. A cure-on-demand, moisture-curable composition according to claim 1, wherein said acid generating material liberates an acid that has a pKa of less than about 1.

16. A cure-on-demand, moisture-curable composition according to claim 1, wherein said acid generating material is selected from the group consisting of carboxylate esters, sulfonate esters, and onium salts.

17. A cure-on-demand, moisture-curable composition according to claim 1, wherein said acid generating material is an onium salt having the structure:

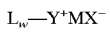

wherein:
L is selected from aryl and substituted aryl groups;
w is an integer from 2 to 4;
Y is selected from sulfur and iodine;
M is a Group IIIA, IVA, or VA element of the Periodic Table of the Elements; and
X is selected from sulfate, aryl sulfonate, alkyl sulfonate, fluoroalkyl sulfonate, fluoroalkyl, and perfluorinated aryl groups.

18. A cure-on-demand, moisture-curable composition according to claim 1, wherein said acid generating material is di(dodecylphenyl)iodonium hexafluoroantimonate.

19. A cure-on-demand, moisture-curable composition according to claim 1, comprising:
(a) 0 to about 100 parts by weight of a compound according to structure (I) wherein A is a polymeric radical;
(b) 0 to about 100 parts by weight of a compound according to structure (I) wherein A is a non-polymeric radical, the sum of (a) and (b) being 100 parts by weight;
(c) about 0.5 to about 20 parts by weight of an onium salt based on 100 parts by weight of (a) plus (b); and
(d) about 0.03 to about 0.1 parts by weight of a sensitizer based on 100 parts by weight (a) plus (b).

20. A cure-on-demand, moisture-curable composition comprising:
(a) a compound comprising molecules bearing reactive silane functional groups; and
(b) an acid generating material having the structure:

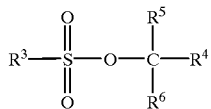

wherein:
$R^3$ is selected from the group consisting of alkyl and fluoroalkyl groups;
$R^4$ represents hydrogen or an alkyl group; and
$R^5$ and $R^6$ each independently represent an alkyl group, or $R^5$ and $R^6$ together with the carbon atom to which they are attached form a ring.

21. A cure-on-demand, moisture-curable composition according to claim 20, further comprising a reactive diluent.

22. A cure-on-demand, moisture-curable composition according to claim 20, wherein the composition is curable to provide a low surface energy material.

23. A cure-on-demand, moisture-curable composition comprising:
(a) a compound comprising molecules bearing reactive silane functional groups; and (b) an acid generating material having the structure:

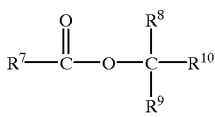

wherein:
$R^7$ is a fluoroalkyl group; and
each of $R^8$, $R^9$ and $R^{10}$ independently represent an alkyl group, or $R^8$ and $R^9$ together with the carbon to which they are attached form a ring.

24. A cure-on-demand, moisture-curable composition according to claim 23, further comprising a reactive diluent.

25. A cure-on-demand, moisture-curable composition according to claim 23, wherein the composition is curable to provide a low surface energy material.

26. A cure-on-demand, moisture-curable composition comprising:
(a) a compound comprising molecules bearing reactive silane functional groups having the structure:

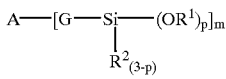

wherein:
moiety A is an m-valent radical;
p is an integer from 1 to 3;
m is an integer greater than or equal to 1;
each $R^1$ is individually selected from alkyl radicals and acyl radicals;
each $R^2$ is individually selected from hydrogen, alkyl radicals, acyl radicals and aryl radicals; and
G has the structure:

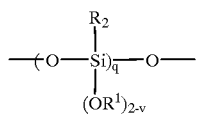

wherein each $R^1$ is individually selected from alkyl radicals and acyl radicals;
each $R^2$ is individually selected from hydrogen, alkyl radicals, acyl radicals and aryl radicals;
q is an integer from 1 to 40; and
v is 0 or 1; and
(b) an acid generating material that is free of ammonium salt;
wherein the reactive silane functional groups are the only acid curable groups present in the composition.

27. A cure-on-demand, moisture-curable composition comprising:
(a) a compound comprising molecules bearing reactive silane functional groups and comprising a polymeric material that is essentially free of basic groups selected from the group consisting of amide, urea, urethane, and sulfonamide groups; and
(b) an acid generating material that is free of ammonium salt and that liberates an acid that is capable of curing of the moisture-curable composition;
wherein the reactive silane functional groups are the only acid curable groups present in the composition and wherein average reactive silane functionality of the moisture-curable composition is greater than two.

28. A cure-on-demand, moisture-curable composition according to claim 27, wherein said acid generating material liberates an acid that has a pKa of less than about 3.

29. A cure-on-demand, moisture-curable composition according to claim 27, further comprising a reactive diluent.

30. A cure-on-demand, moisture-curable composition according to claim 27, wherein the composition is curable to provide a low surface energy material.

31. An article comprising a substrate and a layer of a cure-on demand moisture-curable composition according to claim 1 on the substrate.

32. An article comprising a substrate and a layer of a cure-on demand moisture-curable composition according to claim 27 on the substrate.

33. An article according to claim 1 wherein the moisture-curable composition is coated on the substrate using an electrostatically-assisted coating method.

34. An article according to claim 33 wherein the moisture-curable composition is coated on the substrate using electrospray.

35. An article according to claim 27 wherein the moisture-curable composition is coated on the substrate using an electrostatically-assisted coating method.

36. An article according to claim 31 wherein the moisture-curable composition has been cured.

37. An article according to claim 32 wherein the moisture-curable composition has been cured.

38. An article comprising a substrate and a layer of the moisture-curable composition of claim 20 on the substrate, wherein the moisture-curable composition has been cured.

39. An article comprising a substrate and a layer of the moisture-curable composition of claim 23 on the substrate, wherein the moisture-curable composition has been cured.

40. An article according to claim 36 wherein the article is a release liner.

41. An article according to claim 40 wherein the article is a differential release liner.

42. An article comprising:
(A) a release liner comprising:
(a) a substrate; and
(b) a layer of a cure-on-demand moisture-curable composition on the substrate,
wherein the cure-on-demand, moisture-curable composition comprises:
(1) a compound comprising molecules bearing reactive silane functional groups; and
(2) an acid generating material that is free of ammonium salt;
wherein the reactive silane functional groups are the only acid curable groups present in the composition; and
(B) an adhesive layer.

43. An electrostatically-assisted coatable, cure-on-demand, moisture-curable composition comprising:
(a) a compound comprising molecules bearing reactive silane functional groups; and
(b) an acid generating material that is free of ammonium salt and is electroconductivity enhancing;
wherein the reactive silane functional groups are the only acid curable groups present in the composition.

44. An electrostatically-assisted coatable, cure-on-demand, moisture-curable composition according to claim 43 wherein the composition is electrosprayable.

45. An electrostatically-assisted coatable, cure-on-demand, moisture-curable composition according to claim 43 wherein the acid generating material is selected from the group consisting of (4-octyloxyphenyl)diphenylsulfonium tetrakis(3,5-bis-trifluoromethyl phenyl)borate; tris(dodecylphenyl)sulfonium tetrakis(3,5-bis-trifluoromethyl phenyl)borate; bis(dodecylphenyl)iodonium tetrakis(pentafluorophenyl)borate; (4-octyloxyphenyl)phenyliodonium tetrakis(3,5-bis-trifluoromethyl phenyl)borate; and (tolylcumyl)iodonium tetrakis(pentafluorophenyl)borate.

46. An electrostatically-assisted coatable, cure-on-demand, moisture-curable composition according to claim 43, further comprising an electroconductivity enhancer.

47. A method of curing a composition comprising the steps of:
  (a) providing a moisture-curable composition according to claim 1;
  (b) activating the acid generating material to provide an acid; and
  (c) allowing the composition to cure.

48. A silicone pressure-sensitive adhesive composition comprising:
  (a) 20 to about 80 parts by weight of an urea-linked reactive silane functional polysiloxane having the structure:

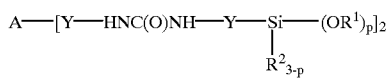

wherein:
  p is an integer from 1 to 3;
  each $R^1$ is individually selected from the group consisting of alkyl radicals and acyl radicals;
  each $R^2$ is individually selected from the group consisting of hydrogen, alkyl radicals, acyl radicals and aryl radicals;
  Y is a divalent radical that independently is an alkylene radical of 1 to 10 carbon atoms, an aralkylene radical or an arylene radical; and
  A corresponds to the following formula:

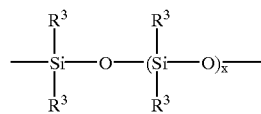

wherein $R^3$ is a vinyl radical or an alkyl moiety and x=100–2000;
  (b) 80 to about 20 parts by weight of a silicate tackifying resin, wherein the sum of (a) and (b) is 100 parts by weight;
  (c) and about 0.5 to about 20 parts by weight of a condensation catalyst or an acid generating material, based on 100 parts by weight of (a) plus (b).

49. An article comprising a substrate and a layer of a silicone pressure-sensitive adhesive according to claim 48 on the substrate.

50. A cure-on-demand, moisture-curable composition comprising:
  (a) a compound comprising molecules bearing reactive silane functional groups having the structure:

wherein:
  moiety A is an m-valent radical selected from fluorosilicone, fluorinated polyacrylate, fluorinated polyether, fluorinated polyester, and combinations thereof;
  p is an integer from 1 to 3;
  m is an integer greater than or equal to 1;
  each $R^1$ is individually selected from alkyl radicals and acyl radicals;
  each $R^2$ is individually selected from hydrogen, alkyl radicals, acyl radicals and aryl radicals; and
  G is an optional linking moiety which, when present, links radical A to the reactive silane functional groups; and
  (b) an acid generating material that is free of ammonium salt and that liberates an acid that is capable of curing the moisture-curable composition;
wherein the reactive silane functional groups are the only acid curable groups present in the composition.

51. A cure-on-demand, moisture-curable composition comprising:
  (a) a compound comprising molecules bearing reactive silane functional groups having the structure:

wherein:
  moiety A is an m-valent radical selected from the group consisting of fluoroalkyl radicals, fluoroaryl radicals, and polymeric radicals comprising a polymer selected from polysiloxane, polyolefin, polyester, polyphosphazene, fluorosilicone, fluorinated polyacrylate, fluorinated polyether, fluorinated polyester, and derivatives and combinations thereof;
  p is an integer from 1 to 3;
  m is an integer greater than or equal to 1;
  each $R^1$ is individually selected from alkyl radicals and acyl radicals;
  each $R^2$ is individually selected from hydrogen, alkyl radicals, acyl radicals and aryl radicals; and
  G is a linking moiety that links radical A to the reactive silane functional groups and is selected from oxygen, alkylene radicals, arylene radicals and

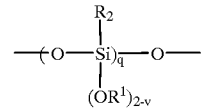

wherein:
  each $R^1$ is individually selected from alkyl radicals and acyl radicals;
  each $R^2$ is individually selected from hydrogen, alkyl radicals, acyl radicals and aryl radicals;

q is an integer from 1 to 40; and v is 0 or 1; and (b) an acid generating material that is free of ammonium salt and that liberates an acid that is capable of curing the moisture-curable composition;

wherein the reactive silane functional groups are the only acid curable groups present in the composition.

52. A cure-on-demand, moisture-curable composition comprising:

(a) a compound comprising molecules bearing reactive silane functional groups having the structure:

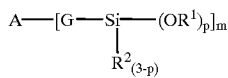 (I)

wherein:

moiety A is an m-valent radical selected from the group consisting of fluoroalkyl radicals, fluoroaryl radicals, and polymeric radicals comprising a polymer selected from polysiloxane, polyolefin, polyester, polyphosphazene, fluorosilicone, fluorinated polyacrylate, fluorinated polyether, fluorinated polyester, and derivatives and combinations thereof;

p is an integer from 1 to 3;

m is an integer greater than or equal to 1;

each $R^1$ is individually selected from alkyl radicals and acyl radicals;

each $R^2$ is individually selected from hydrogen, alkyl radicals, acyl radicals and aryl radicals; and G is an optional linking moiety which, when present, links radical A to the reactive silane functional groups; and (b) an acid generating material that is free of ammonium salt and that liberates an acid that is capable of curing the moisture-curable composition;

wherein the reactive silane functional groups are the only acid curable groups present in the composition and wherein the composition comprises:

(i) 0 to about 100 parts by weight of a compound according to structure (I) wherein A is a polymeric radical;

(ii) 0 to about 100 parts by weight of a compound according to structure (I) wherein A is a non-polymeric radical, the sum of (i) and (ii) being 100 parts by weight;

(iii) about 0.5 to about 20 parts by weight of an onium salt based on 100 parts by weight of (i) plus (ii); and (iv) about 0.03 to about 0.1 parts by weight of a sensitizer based on 100 parts by weight (i) plus (ii).

* * * * *

UNITED STATES PATENT AND TRADEMARK OFFICE
CERTIFICATE OF CORRECTION

PATENT NO. : 6,204,350 B1
DATED : March 20, 2001
INVENTOR(S) : Liu, Junkang Jacob It is certified that error appears in the above-identified patent and that said Letters Patent is hereby corrected as shown below:

Column 19,
Line 38, "$[R_nB^{30}]$" should be -- $[R_nB^+]$ --

Column 31,
Line 17, "coating w as" should be -- coating was --

Signed and Sealed this

Twenty-third Day of December, 2003

JAMES E. ROGAN
*Director of the United States Patent and Trademark Office*